US012781931B2

(12) United States Patent
Schnuckle et al.

(10) Patent No.: US 12,781,931 B2
(45) Date of Patent: Nov. 3, 2026

(54) KINETIC FLAME DEVICE

(71) Applicant: L&L Candle Company, LLC, Brea, CA (US)

(72) Inventors: Gary W. Schnuckle, Altadena, CA (US); Douglas M. Patton, Irvine, CA (US)

(73) Assignee: L&L Candle Company, LLC, Brea, CA (US)

( * ) Notice: Subject to any disclaimer, the term of this patent is extended or adjusted under 35 U.S.C. 154(b) by 0 days.

(21) Appl. No.: 19/268,524

(22) Filed: Jul. 14, 2025

(65) Prior Publication Data

US 2026/0043529 A1 Feb. 12, 2026

Related U.S. Application Data

(63) Continuation of application No. 18/425,755, filed on Jan. 29, 2024, now Pat. No. 12,359,784, which is a (Continued)

(51) Int. Cl.

| | |
|---|---|
| ***F21S 10/04*** | (2006.01) |
| ***F21K 9/23*** | (2016.01) |
| ***F21S 6/00*** | (2006.01) |
| ***F21V 17/02*** | (2006.01) |
| ***F21V 17/06*** | (2006.01) |

(Continued)

(52) U.S. Cl.
CPC .............. *F21S 10/046* (2013.01); *F21K 9/23* (2016.08); *F21S 6/001* (2013.01); *F21S 10/04* (2013.01); *F21V 17/02* (2013.01); *F21V 17/06* (2013.01); *F21V 17/10* (2013.01); *H01K 7/06* (2013.01); *F21W 2121/00* (2013.01); *F21Y 2115/10* (2016.08); *H05B 47/10* (2020.01); *H05B 47/165* (2020.01)

(58) Field of Classification Search
CPC .......... F21S 10/046; F21S 6/001; F21S 10/04; F21K 9/23; F21V 17/02; F21V 17/06; F21V 17/10; H01K 7/06
See application file for complete search history.

(56) References Cited

U.S. PATENT DOCUMENTS 3,639,749 A * 2/1972 Beckman ................ F21S 10/04 362/392
3,814,973 A * 6/1974 Thouret ................... H01K 1/32 313/313

(Continued)

*Primary Examiner* — Leah Macchiarolo
(74) *Attorney, Agent, or Firm* — Ashurst Perkins Coie US LLP

(57) ABSTRACT

An electric candle device that resembles a real was candle includes an outer shell with an uneven edge around the top of the outer shell. The device includes one or more light emitting elements positioned within a cavity inside the outer shell and that emit beams at a non-zero angle with respect to a longitudinal axis of the electric lighting device to provide illumination from within the cavity in an upward direction and reaching above the top surface after passing through the opening. An optical element is positioned to receive light from the one or more light emitting elements and to direct the received light toward the top surface. The optical element has a focal point to change one or both of a size and direction of the light received prior to projecting the light in the direction of the top surface.

20 Claims, 14 Drawing Sheets

Related U.S. Application Data continuation of application No. 17/460,675, filed on Aug. 30, 2021, now Pat. No. 11,885,467, which is a continuation of application No. 17/121,078, filed on Dec. 14, 2020, now Pat. No. 11,105,481, which is a continuation of application No. 16/520,928, filed on Jul. 24, 2019, now Pat. No. 10,976,020, which is a continuation of application No. 16/031,866, filed on Jul. 10, 2018, now Pat. No. 10,502,377, which is a continuation of application No. 14/740,387, filed on Jun. 16, 2015, now Pat. No. 10,018,313, which is a continuation of application No. 14/247,919, filed on Apr. 8, 2014, now abandoned, which is a continuation of application No. 14/016,339, filed on Sep. 3, 2013, now Pat. No. 8,727,569, which is a continuation of application No. 13/758,057, filed on Feb. 4, 2013, now Pat. No. 8,534,869, which is a continuation of application No. 13/709,292, filed on Dec. 10, 2012, now Pat. No. 8,721,118, which is a continuation of application No. 12/986,399, filed on Jan. 7, 2011, now Pat. No. 8,342,712, and a continuation-in-part of application No. 12/851,749, filed on Aug. 6, 2010, now Pat. No. 8,070,319, which is a continuation-in-part of application No. 12/506,460, filed on Jul. 21, 2009, now Pat. No. 7,837,355.

(60) Provisional application No. 61/293,516, filed on Jan. 8, 2010, provisional application No. 61/101,611, filed on Sep. 30, 2008.

(51) Int. Cl.

| | |
|---|---|
| ***F21V 17/10*** | (2006.01) |
| ***H01K 7/06*** | (2006.01) |
| *F21W 121/00* | (2006.01) |
| *F21Y 115/10* | (2016.01) |
| *H05B 47/10* | (2020.01) |
| *H05B 47/165* | (2020.01) |

(56) References Cited

U.S. PATENT DOCUMENTS

| | | | | |
|---|---|---|---|---|
| 2006/0034079 | A1* | 2/2006 | Schnuckle | B44C 5/06 362/253 |
| 2008/0130266 | A1* | 6/2008 | DeWitt | A61L 9/12 422/123 |
| 2009/0135586 | A1* | 5/2009 | Yang | F21V 9/12 362/101 |

* cited by examiner

UP POSITION (ON)

KINETIC FLAME DEVICE

CROSS-REFERENCE TO RELATED APPLICATION(S)

This patent document is a continuation of U.S. patent application Ser. No. 18/425,755, filed Jan. 29, 2024, which is a continuation of U.S. patent application Ser. No. 17/460,675, filed Aug. 30, 2021, now U.S. Pat. No. 11,885,467, which is a continuation of U.S. patent application Ser. No. 17/121,078, filed Dec. 14, 2020, now U.S. Pat. No. 11,105,481, which is a continuation of U.S. patent application Ser. No. 16/520,928, filed Jul. 24, 2019, now U.S. Pat. No. 10,976,020, which is a continuation of U.S. patent application Ser. No. 16/031,866, filed Jul. 10, 2018, now U.S. Pat. No. 10,502,377, which is a continuation of U.S. patent application Ser. No. 14/740,387, filed Jun. 16, 2015, now U.S. Pat. No. 10,018,313, which is a continuation of U.S. patent application Ser. No. 14/247,919, filed on Apr. 8, 2014, now abandoned, which is a continuation of U.S. patent application Ser. No. 14/016,339, filed on Sep. 3, 2013, now U.S. Pat. No. 8,727,569, which is a continuation of U.S. patent application Ser. No. 13/758,057, filed on Feb. 4, 2013, now U.S. Pat. No. 8,534,869, which is a continuation of U.S. patent application Ser. No. 13/709,292, filed Dec. 10, 2012, now U.S. Pat. No. 8,721,118, which is a continuation of U.S. patent application Ser. No. 12/986,399, filed Jan. 7, 2011, now U.S. Pat. No. 8,342,712, and also claims the benefit of U.S. Provisional Application No. 61/293,516, filed Jan. 8, 2010, and is also a continuation-in-part of U.S. patent application Ser. No. 12/851,749, filed Aug. 6, 2010, issued as U.S. Pat. No. 8,070,319, which is a continuation-in-part of U.S. patent application Ser. No. 12/506,460, filed Jul. 21, 2009, issued as U.S. Pat. No. 7,837,355, which claimed the benefit of U.S. Provisional Application No. 61/101,611, filed Sep. 30, 2008, all of which are incorporated herein by reference in their entireties.

TECHNICAL FIELD

The present description relates, in general, to methods and systems for animated lighting, and, more particularly, to systems, devices, and methods for simulating a flickering flame providing kinetic light movement.

BACKGROUND

A difficult challenge for a special effects artist is the simulation of a single candle flame. Simulated flames in large fires such as fireplaces or stage sets are comparatively easy to design because they are normally viewed from a distance, and much of the effect of a large fire involves glow and embers, which can be readily simulated. A single candle, however, is often viewed at short distances with the focus of the effect falling on the flickering light of the solitary flame moving kinetically or randomly on a wick.

Flames are the visible, light-emitting part of a fire. Solitary flames are complex kinetic interactions of fuel, temperature gradients, convection, and ambient airflow. These interactions produce a continuously and randomly moving light having loosely defined regions of various colors where the regions change size and shape kinetically or in unpredictable manners in space. Despite the complexity, people are so familiar with the appearance of natural flames that it is very difficult to provide a convincing simulation that appears real or natural to a viewer, especially at short viewing distances of several feet or less.

Combustion-based candles create safety issues in many environments because of the presence of flame and heat. These conventional candles are high-maintenance and, so, are not suitable for long-term usage such as in religious buildings, theme parks, memorials, window displays, museums, and the like without continuous maintenance. On the other hand, conventional wax candles produce a light that appeals to many people and can be readily manufactured for a wide variety of applications such as table lighting, room lighting, wall sconces, spiritual ceremonies, theatrical lighting, decorative lighting, and lighting for holidays and special events. Hence, a continuing need exists for an artificial flame simulator that can be used more safely and with less maintenance than conventional wax or combustion candles, and the artificial flame simulator or device should produce a pleasing and realistic simulation of solitary flames and be adaptable to a variety of form factors.

There are a variety of flame imitation novelty products that utilize various methods to simulate a real flame for display purposes such as those disclosed in U.S. Pat. Nos. 7,125,142, 6,454,425 and 4,550,363. Specifically, U.S. Pat. No. 7,125,142 describes a device that uses multiple colored lights affixed to a translucent shell where the lights are energized according to a computer program that attempts to animate the light without moving parts. U.S. Pat. No. 6,454,425 discloses a candle flame simulating device that includes a blowing device for generating an air flow and for directing the flowing air toward a flame-like flexible member, in order to blow and oscillate or to vibrate the flame-like flexible member so as to simulate a candle. U.S. Pat. No. 4,550,363 discloses an electric-light bulb fitted with a light permeable and light-scattering lamp casing. These and other attempts result in flame displays that are relatively poor imitations of a real flame and have not been widely adopted by the commercial or retail markets. In addition, such devices typically require substantial energy inputs and require frequent battery replacement, which can drive up purchase and operating costs and require undesirable levels of maintenance for ongoing use.

SUMMARY

The present invention addresses the above and other problems by providing kinetic flame devices that create lighting effects driven by real but chaotic physical movements and by providing methods for making and using such kinetic flame devices. Some embodiments of the present invention may include a drive mechanism that stimulates and/or perturbs a complex interaction between gravity, mass, electromagnetic field strength, magnetic fields, air resistance, and light to achieve a kinetic or random flame effect, but, interestingly, the complex interaction is not directly modulated or controlled so as to reduce control and/or driving requirements or components. The motion and light generated by the kinetic flame devices produce light that convincingly reproduces the kinetic light output of a solitary flickering flame such as may be provided by a conventional combustion or wax candle.

More particularly, an apparatus is provided for simulating a flame such as a flame of a candle or the like. The flame simulating apparatus may include a housing with one or more sidewalls (or housing portions) that define an interior space with a first stage and a second stage (or upper and lower spaces). A drive mechanism such as an electric coil may be provided for generating a time varying electromagnetic field that extends into the first stage. The apparatus may also include a first stage pendulum member that is pivotally mounted within the interior space of the first stage. The first stage pendulum member may include a first magnet on a first end (e.g., embedded or attached permanent magnet) and a second magnet on a second end (e.g., embedded or attached permanent magnet). In some cases, the first end is positioned proximate to the drive mechanism such that the first magnet interacts with the time varying electromagnetic field to kinetically displace (or displace in a random pattern) the first stage pendulum member over time (or over/during an operating period for the drive mechanism).

The apparatus may also include a second stage pendulum member that is pivotally mounted within the interior space of the second stage. The second stage pendulum member includes a magnet on a first end (e.g., a permanent magnet attached or embedded to the member), and this end of the second stage pendulum member is positioned proximate to the second end of the first stage pendulum member. In other cases, ferromagnetic materials are provided in place of the magnets, e.g., the drive mechanism may apply a force on a tag or element of ferromagnetic material with the other end of this first stage pendulum having a magnet or another ferromagnetic material (with the second stage pendulum having either a magnet or a ferromagnetic tag/element depending on the first stage pendulum's inclusion of a magnet or ferromagnetic material as one of these two proximate components would be a magnet). In some cases, the two ends of the pendulum members are spaced apart to avoid physical/mechanical interference but close enough that their magnets interact to transmit the kinetic movement of the first stage pendulum member to the second stage pendulum member. The second stage pendulum member may further include a flame silhouette element extending from a second end of the second stage pendulum member. The apparatus also may include a light source adapted to selectively transmit light onto the flame silhouette element. The drive mechanism may include a coil of wire and a signal generator providing time-varying current to the coil to create the time-varying magnetic field.

During use, in response to the interaction between the first magnet and the time-varying magnetic field, the first stage pendulum member may be displaced in a random pattern over time. Further during use, in response to the displacement of the first stage pendulum member in the random pattern, the second stage pendulum member may be displaced in another random pattern, whereby the flame silhouette element has kinetic motion concurrently with receiving the light from the light source.

In some embodiments of the apparatus, the first and second stage pendulum members each comprise an elongated, planar body. The body of the first stage pendulum member may be pivotally supported by a first support element at a first location proximate to the second end of the first stage pendulum member while the body of the second stage pendulum member may be pivotally supported by a second support element at a second location proximate to the second end of the second stage pendulum member. The first support member may include a rigid body (such as a wire, rod, shaft, or the like) that extends across the interior space of the housing and through a hole at the first location in the first stage pendulum member. Similarly, the second support member may include a rigid body that extends across the interior space of the housing and through a hole at the second location in the first stage pendulum member. In other embodiments the first (and, in some cases, the second) support member may be a flexible member such as a thread or the like so as to allow a more chaotic movement of the lower pendulum such as by allowing a side-to-side movement of the flexible member relative to its tethered ends. The first location in the first stage pendulum member may be disposed between the first and second magnets and more proximate to the second magnet than to the first magnet.

In some embodiments of the apparatus, the first and second support members each extend, at a central portion mating with the first and second stage pendulum members, respectively, a distance toward the drive mechanism. According to some embodiments, the apparatus includes a base that is mated with or a part of the housing and is located adjacent the first stage. In such embodiments, the base houses the drive mechanism and may be configured to electrically couple to a light socket to provide a power source for the drive mechanism and for the light source. In other embodiments, the electrical coupling may be provided with the base having a plug such as for a standard wall socket to allow the base to be plugged directly into a wall socket (e.g., similar to a night light but with a flame effect).

DETAILED DESCRIPTION

The present invention involves devices that create lighting effects driven by real, chaotic, and physical movements and methods for making and using such devices. Prior devices that attempt to simulate flickering flames generally used modulated or controlled motion to mimic a flame, but these devices produced less than ideal results in part because the complexity of a natural flame is difficult to mimic or simulate. Alternatively, some prior devices attempted to control or modulate the intensity, color, and/or other characteristics of a light source such as by blinking, which also produced a less than realistic result. In contrast, the present invention stimulates and/or perturbs a complex interaction between gravity, mass, electromagnetic field strength, magnetic fields, air resistance, and light, but the complex interaction is not directly modulated or controlled. Accordingly, the motion and light generated by the system in accordance with the present invention produces light that convincingly reproduces the kinetic or random light output of a flickering flame.

Figure 1:
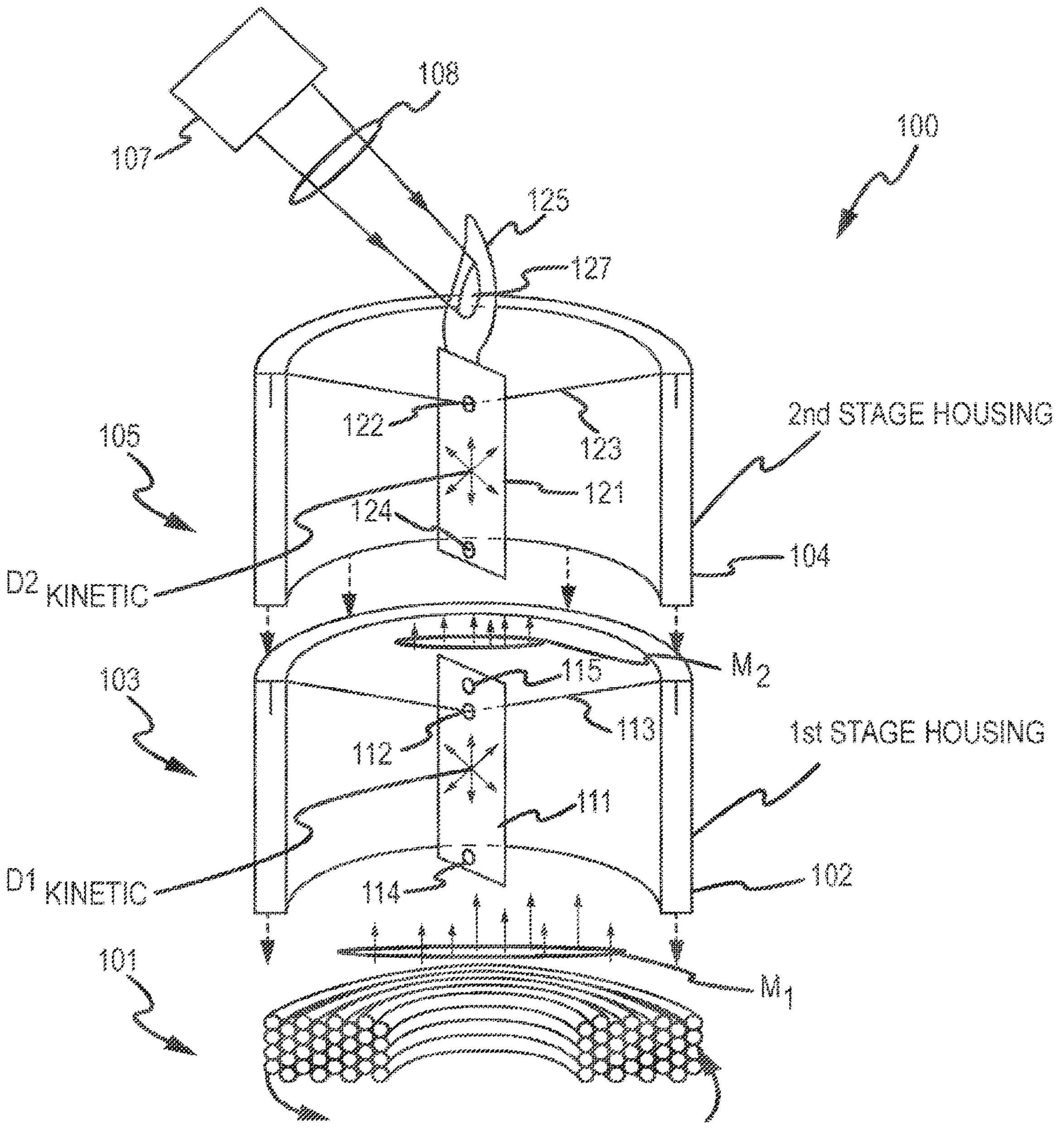
FIG. 1 shows a cut-away perspective view of an embodiment of a kinetic flame effect device in accordance with the present invention.

The present invention can be adapted to a wide variety of form factors to meet the needs of particular applications. FIG. 1 shows a single-flame candle implementation whereas the implementations of FIGS. 3-6 demonstrate lamp-base form factors that can be used as a bulb alternative with many conventional lighting fixtures. Embodiments of the invention can vary in scale to meet the functional and aesthetic needs of a particular application. Power supplies described herein may be provided by batteries, AC/DC power supplies, solar cells, or other available power sources. Although the invention involves complex interactions between many forces, it is typically preferred that the elements of the invention be implemented simply to enhance reliability and longevity of the product. Accordingly, although specific examples of particularly robust construction and components are described herein, actual implementations may vary in complexity.

FIG. 1 shows a cut-away perspective view of an embodiment of a kinetic flame device 100 in accordance with the present invention that resembles a conventional wax candle such as a pillar, taper, container candle, votive, tea light and the like depending on the scale and dimensions of the particular application. FIG. 1 shows a two stage assembly for convenience in manufacture, but the invention can be implemented as a unitary, single stage body, in two stages as shown in FIG. 1, or as three or more stages if desired. Additional stages affect the form factor as well as the range, speed and variability of the light produced. A stage may damp or amplify these characteristics depending on the particular geometry of the elements within the particular stage.

A drive mechanism (or electrically driven motion engine) 101 is provided that acts to create a time-varying magnetic field, $M_1$, and this mechanism may take a variety of forms such as a coil as shown in FIG. 1. Drive mechanism or coil 101 at the base of the embodiment in FIG. 1 includes a wound wire coil, which may be formed, for example, using a conductive wire coated with an insulator. The windings of coil 101 may be held in place with tape, adhesive, epoxy or other material (not shown) that holds the wire together in a desired shape. The coil 101 may be generally circular as shown in FIG. 1 or any other convenient shape such as oval, square, triangular, or an irregular shape. Coil 101 may have an air core or hollow space/void as shown in FIG. 1, or may use a magnetic core such as iron, iron alloys, ferrite, permalloy and other available magnetic core materials. The core may be substantially centrally located within coil 101 with a generally cylindrical shape or may be off-center in particular applications with a differing or similar shape.

Figure 2:
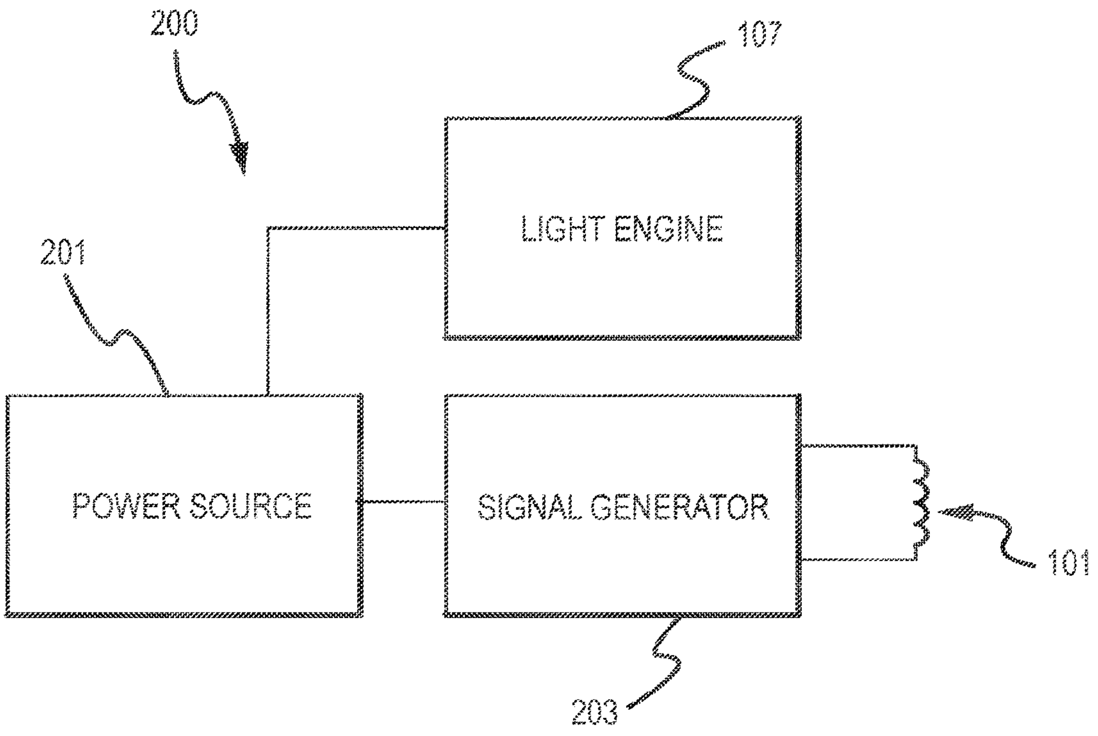
FIG. 2 shows an exemplary drive mechanism in accordance with an embodiment of the present invention as may be used with the device of FIG. 1, for example.

In some embodiments, permanent magnets (not shown) may be integrated in, placed on the surface of, or otherwise placed in proximity to coil 101 to provide a static magnetic field that is cumulative with the time varying electromagnetic field produced when coil 101 is energized (as shown in FIG. 2). Although a single coil 101 is shown in FIG. 1, it is contemplated that two or more independently or synchronously energized coils may also be used that are distributed symmetrically or asymmetrically about a central axis of the candle device (e.g., an axis that extends upward through the first and second stage housings 102, 104 and in some cases through pendulums or pendulum members 111, 121) so as to produce more complex magnetic fields; however, this complexity and attempt to explicitly control the magnetic field shape may offer diminishing returns or even detrimentally effect the convincing result produced by the single coil implementation shown in FIG. 1.

In operation, coil 101 is energized by a time-varying electric current to produce a time-varying magnetic field. $M_1$, in the vicinity of coil 101. In some embodiments, core material is used to focus and direct the magnetic field that is produced and to alter the power requirements for the operation of the present invention. In the same or other embodiments, permanent magnets are used in or near the coil 101 to superimpose a static magnetic field on top of the time-varying field, $M_1$, created by energizing coil 101. The additional static magnetic field may be used to alter power requirements as well as to selectively modify or define the shape of the magnetic field, $M_1$, in the vicinity of coil 101.

The first stage 103 serves to translate the time varying electromagnetic field, $M_1$, produced by coil 101 into kinetic motion, $D1_{Kinetic}$. The first stage 103 is positioned such that at least its base is within the electromagnetic field, $M_1$, produced from coil 101 and elements within first stage 103 are magnetically coupled to coil 101 when its electromagnetic field, $M_1$, is present. Specifically, a magnet 114 positioned or mounted at a lower end of pendulum or first stage pendulum member 111 is within the time varying electromagnetic field, $M_1$. Magnet 114 is preferably a small permanent magnet with sufficient magnetic field strength to be moved in response to either repulsive or attractive forces resulting from interaction with the time varying electromagnetic field, $M_1$, produced by coil 101 such that the pendulum member 111 is displaced in a random or kinetic manner as shown with arrows $D1_{Kinetic}$. For example, the pendulum member 111 may have an elongate body such as a thin planar design with a rectangular, elliptical, or other shape that may be formed of plastic or other non-ferrous material (e.g., a plastic rectangle with a width of about 0.25 to 2 inch width, a length of about 0.5 to 4 inches, and a thickness of 0.2 inches or less). The displacement, $D1_{Kinetic}$, may vary widely to practice the invention but may be a random pattern with movements of up to 0.5 inches or more in any direction from an original or at rest position.

While the present invention operates with any polar alignment of magnet 114, the polar alignment of magnet 114 and that of the electromagnetic field produced by coil 101 is coordinated or selected to produce desired results or kinetic movement/displacement, $D1_{Kinetic}$, of the lower or first stage pendulum member 111. For example, when coil 101 produces a north pole facing upward then aligning magnet 114 (which may be termed as a first or lower magnet of the lower pendulum member herein) with a south pole facing downward will increase the net attractive coupling force, whereas aligning magnet 114 with a north pole facing downward will increase the net repulsive coupling force, and either arrangement may be useful in some embodiments of the device 100. Aligning magnet 114 at an angle will have a predictable effect on the mix between attractive and repulsive coupling forces and may be suitable or desirable in particular applications. Rare earth permanent magnets, ferrite magnets, ceramic magnets and the like are suitable for magnet 114. It is also possible to replace magnet 114 with a ferrous material that is attractively coupled to the electromagnetic field.

First stage or lower housing 102 may be generally tubular in shape with a sidewall defining an interior space or void for containing the lower pendulum member 111 and an interaction space or area for the magnetic field/forces, $M_1$, and the lower magnet 114 of pendulum member 111. The housing 102 may have a sidewall formed of plastic, glass, ceramic, molded epoxy, or other material that can be formed into a desired shape for the particular application. Housing 102 may in some cases, include metal, however, some metals may affect the electromagnetic field. Housing 102 may be open at each end as shown or on one end, or, in some cases, it may be sealed at upper and/or lower ends with a magnetically permeable material such as glass, plastic, or the like. First stage or lower housing 102 may be sealed with a vacuum and/or may be sealed and contain air or fluid so as to manipulate or control the damping of pendulum 1 to obtain a desired responsive kinetic or random displacement/motion, $D1_{Kinetic}$, in response to the input magnetic field, $M_1$, from coil 101. In some cases, the first stage housing 102, pendulum 111, and the support 113 may also be considered or called a coupling member that is provided in the drive mechanism or motion engine 101 (or coupled to such mechanism, engine, or coil), and, additionally, the second pendulum member 121 along with its flame silhouette 125 may be considered a flame body.

Lower or first stage pendulum member 111 is pivotally mounted within or pivotally supported by a support element provided within first stage housing 102. Such pivotal support may be provided in a variety of ways to allow the pendulum to be kinetically displaced, $D1_{Kinetic}$, about the pivot point or mounting location. For example, but not as a limitation, the pendulum member 111 may have a pivot hole 112 formed to allow a pendulum support 113, such as a rod, axle, wire, string, or the like, to pass through. In some embodiments, the support 113 is flexible and/or has a range or span of travel to allow it to move with the pivotally supported member 111, e.g., a string or thread that is flexible and is able to move side-to-side some amount (not completely taut) to introduce more chaotic movement to the lower pendulum member 111. For example, the support element 113 may be a flexible wire, line, or thread with a length greater than a diameter of the housing (or the distance between the sidewalls of housing 102) such that it has a bit of play or slack that allows it to move in any direction from an at rest or original position (e.g., move 360 degrees from an at rest position a distance or displacement such as up to 0.5 inches or more but often less than about 0.25 inches). In other embodiments, though, it is preferable that the support element 113 is rigid or semi-rigid and does not move with the pendulum member 111.

Hole 112 is formed in the upper half of pendulum 111 such that more of the mass of pendulum 111 is below the pivot hole 112 than is above pivot hole 112 (e.g., at 0.1 to 0.45 times the length of the pendulum member 111 as measured from the top edge or the like). Note, as the location of pivot point approaches equilibrium near the center of pendulum 111, pendulum 111 becomes increasingly unstable and exhibits increasingly chaotic motion. With this in mind, in the exemplary embodiment shown in FIG. 1, the pivot point or location of hole 112 is moved upward with respect to the midpoint of pendulum 111 (e.g., in the range of 0.1 to 0.3 of the pendulum length), which increases stability and decreases the movement, $D1_{Kinetic}$, of the flame illusion, but this positioning of the pivot point or hole 112 decreases the range of motion of the upper end of pendulum 111, which may be desirable in some embodiments. The location of pivot point 112 can be selected to meet the needs of a particular application. This arrangement allows pendulum 111 to hang in a stable position absent the affects of the electromagnetic field and allows gravity to act on the mass of pendulum member 111 and lower magnet 114 attached to pendulum 111. Other mechanisms, such as a gimbal or other joint(s), allowing multi-axis movement may be used as an alternative to the pivotal mounting provided by the combination of the pivot hole 112 and support element 113.

Pendulum support wire 113 is attached to the walls of housing 102 for support at locations selected to place pendulum 111 generally in the center of the hollow space defined by walls of housing 102 so that support wire 113 spans a diameter when housing 102 has a circular cross section. In some preferred embodiments, support element 113 may include a rigid or semi-rigid wire such as a steel or steel alloy wire or rod and is preferably bent to form a low spot at a location where it is desired for pendulum 111 to rest (e.g., the mounting locations for the ends of the wire 113 may be about 0.1 to 0.5 or more inches above the low, center point or pivotal supporting portion of the wire 113). Hole 112 in pendulum member 111 is sufficiently larger than the diameter of support wire 113 such that pendulum 111 swings or pivots freely about support wire 113 but at the same time is held in generally the same location and orientation unless pendulum 111 is perturbed by the electromagnetic field, $M_1$.

In this manner, the top portion of pendulum member 111 is able to move back and forth with pendulum movement, $D1_{Kinetic}$, within a generally cone-shaped extent having hole 112 as an apex, as well as flutter.

A small permanent magnet 115, which may be similar in composition and alignment to magnet 114, is positioned at the upper end of pendulum 111, e.g., between the hole 112 and an upper side or edge of the pendulum member 111. Pendulum member 111 is sized with respect to housing 102 such that it moves freely within housing 102 about the pivot location defined by the apex, dip, low point, or valley in support wire 113. In the particular embodiment, the length of pendulum 111 is selected such that when assembled as shown in FIG. 1 the lower portion of pendulum 111 is above the lowest portion of wall 102 and the upper portion of pendulum 111 is below the highest portion of wall 102. This arrangement inhibits or prevents the mechanical interaction between elements in the first and second stages 103 and 105 as well as mechanical interaction between pendulum 111 and coil 101. Although some mechanical interaction can be tolerated, by preventing mechanical interaction the end result or kinetic flame effect is believed to be smoother while more kinetic/random and realistic.

In operation, the electromagnetic field causes magnet 114 to move either repulsively or attractively. That motion, $D1_{Kinetic}$, is translated through pendulum 111 to which magnet 114 is affixed. The extent of motion of the lower end of pendulum 111 is greater than the extent of motion of the upper end of pendulum 1 to a degree determined by the position of hole 112 (e.g., $D1_{Kinetic}$ for the pendulum 111 may be thought of as having a lower component that is greater than an upper component such as two to four times as much in the lower component or the like). Gravity tends to return pendulum 111 to an upright position whereas the time varying electromagnetic field, $M_1$, may continuously perturb pendulum 111 and may be used to prevent a steady state return to the upright position. In a particular example of using a sinusoidal varying electromagnetic field, pendulum 111 dances about quite energetically and in random directions with varying magnitudes of displacement, $D1_{Kinetic}$.

Air resistance acting on the surface area of pendulum 111 damps the motion of pendulum 111. Accordingly, the size and shape of pendulum 111 can be altered to provide the speed and degree of kinetic movement desired for a particular application. In some embodiments, air resistance is controlled by using a more irregular shape such as an hour glass shaped member 111 and in other cases air dampening is controlled by providing one or more mesh or porous sections to allow air flow through the body of member 111. In other cases, the lower portion of the pendulum member 111 may be made heavier with more surface area/mass or with addition of weights to achieve a desired and tunable kinetic movement/displacement, $D1_{Kinetic}$, of the member 111.

Second stage 105 comprises a housing 104 that preferably has a composition and size that is substantially similar to housing 102 so that the stages 103 and 105 (or the corresponding houses 102, 104) can be mated or coupled together to form a candle or device body with solitary or unitary appearance. Second stage 105 generally serves to couple to the kinetic energy in the moving upper end of pendulum 111 and translate that kinetic energy into motion of flame silhouette element or extension 125. The construction and operation of second stage 105 is similar to that of first stage 103. Upper stage pendulum member 121, which is slightly shorter than the length of housing 104, is pivotally mounted via a pivot hole 122 on a pendulum support element 123, e.g., a rigid or semi-rigid wire or the like in some embodiments with a lower supporting portion or area in the center of the element 123. The support element 123 is mounted at each end to the sidewall of the housing 104 (such as at the upper edges of the sidewall at opposite locations to stretch across the space or void defined within the sidewall of housing 104). A first or lower magnet 124 (similar in composition, size, and alignment to the first or lower magnet 114 of the first stage pendulum member 111 and second or upper magnet 115 of the first stage pendulum member as described hereinbefore) is mounted at a lower (or first) portion or end of pendulum member 121. Magnet 124 is positioned so as to be magnetically coupled to magnet 115 or influenced by magnetic field or forces, $M_2$. The magnetic coupling, $M_2$, is preferably repulsive, but it may also be attractive or a mix between attractive and repulsive coupling. For example, in one useful implementation, the magnetic couplings are attractive, and gravity is used to bring the pendulum members back to a central or neutral position. In use, the coil in such a case may provide a donut shaped magnetic field such that attractive magnetic coupling provides an auto-start upon power up as it moves the nearby pendulum away from the neutral position.

Flame silhouette element 125 comprises a flat or dimensional body of material preferably formed with a flame-shaped outline or peripheral pattern. Flame silhouette element 125 extends outward from an edge or side of the upper (or second) portion/end of the second stage pendulum member 121. Element 125 may include a sheet of material such as paper or plastic and/or is formed of the same or differing material as the body of pendulum member 121. Flame silhouette element 125 may be two dimensional or a distorted sheet material that extends in three dimensions, or may be a fully three dimensional object. The mass and air resistance of flame silhouette 125 adds to the mass and air resistance of pendulum 121 and so its configuration is typically taken into consideration when locating pivot hole 122 relative to the upper or second end of the pendulum member 121.

In operation, the magnetic field, $M_2$, produced by magnet 115 causes magnet 124 to move either repulsively or attractively. That motion is translated through pendulum 121 to which flame silhouette 125 is affixed as shown with second kinetic or random motion or displacement, $D2_{Kinetic}$. As with the pendulum member 111 of the first stage 103, the extent or magnitude of motion or kinetic displacement of the lower end of pendulum 121 is greater than the extent of motion of the upper end of pendulum 121 to a degree determined by the position of hole 122 relative to the edge of the upper portion of pendulum 121 (e.g., the kinetic displacement, $D2_{Kinetic}$, has a larger component in the lower or first end/portion of the pendulum 121 than in the upper or second end/portion of the pendulum 121 such as 2 to 4 times as much movement or the like in the lower or first end/portion). In one embodiment, the first stage or lower pendulum member 111 is longer ranging while the upper pendulum 121 is shorter ranging, and this may be controlled by selecting the distance of each of these pendulum members 111, 121 from their pivot point (e.g., make the lower pendulum 111 have more movement by having pivot hole 112 farther away from magnet/ferromagnetic material component 14 than pivot hole 122 from component 124).

In some embodiments, pivot hole 122 is provided at a location comparable to the base of a wick in a combustion candle (e.g., 0.1 to 1 inch or more below upper lip or edge of the second stage housing 104). Gravity tends to return pendulum 121 to an upright position whereas the magnetic influence, $M_2$, of moving magnet 115 continuously perturbs pendulum 121 and inhibits a steady state return to the upright position. Air resistance acting on the surface area of pendulum member 121 and flame silhouette element 125 damps the motion, $D2_{Kinetic}$, of pendulum member 121. Accordingly, the size and shape of pendulum member 121 can be altered to provide the speed and degree of kinetic movement, $D2_{Kinetic}$, desired for a particular application or embodiment of device 100. Note, that the components 114, 115, 124 may be magnets or ferromagnetic material with one embodiment providing a ferromagnetic tag for element 114 and then a ferromagnetic tag for element 115 or 124 while another embodiment uses a magnet for element 114 and ferromagnetic material for element 115 or 124 (e.g., only one of each magnetic coupling pair of components is a magnet to provide desired driving forces).

Although the arrangement described hereinbefore produces kinetic motion in flame silhouette 125, it is not this motion or the shape of element 125 alone that produces a convincing flame simulation. The nature of the light reflected from or produced by the device 100 is also significant in producing the convincing effect, not the motion and shape of its elements. To this end, some embodiments of the device 100 may include a flame silhouette element 125 that is shaped as a simple geometrical shape such as a triangle, circle, or arbitrary shape to produce a desirable effect while the illustrated element 125 has a shape or peripheral pattern similar to a candle or solitary flame.

In the particular implementation 100 of FIG. 1, a spotlight 107 mounted above flame silhouette 125 is aimed to direct light 108 toward the element 125 to produce a spot of light 127 on the surface of flame silhouette element 125. One or more light sources 107 may be used, and, when used, the multiple light sources may be aligned so that their produced spots of light 127 are aligned with each other in the vicinity of silhouette element 125 even as silhouette element 125 moves in normal operation with the kinetic movement, $D2_{Kinetic}$, Of upper or second stage pendulum member 121.

Light source 107 includes, for example, a light emitting diode(s) (LED(s)) or other efficient low power light source coupled with a converging lens to optically direct the produced light into a desired size and shape. An incandescent light, organic light emitting diode (OLED), or other device is also suitable for light source 107. Alternatively, a narrow beam light source, even a laser, may be used with a diverging lens to produce the desired shape and size of light spot 127, e.g., a shape similar to the pattern/shape of the element 125 and size similar to or smaller than the element 125 to control blow by. The light source 107 may also include fiber optic light pipes to transport light from a remote light-emitting device to a desired location and angle. Light source 107 may project downward as shown in FIG. 1, or upward, or at any angle to meet the needs of a particular application or implementation of device 100. In some cases, flame silhouette 125 can be bent slightly out of a vertical alignment or alignment with pendulum 121 so as to reflect light from light source 107 to an expected location of a viewer.

Light source 107 may be colored using a colored light source or filters. Light source 107 may comprise multiple light sources to produce several colors, and the light sources may be energized statically or dynamically to provide color variation. These types of controlled light production may enhance the effect of the present invention but are not necessary in most instances and may actually detract from the effect in certain applications because, as noted hereinbefore, simulating flame effects with direct modulation and control by itself does not produce suitable results in many instances. However, as an augmentation of the basic kinetic light movement principle in accordance with the present invention such direct manipulation and control of the light output may produce desirable results in particular applications.

Alternatively, or in addition, the surface of flame silhouette 125 is colored with a single color, gradient color, or a color pattern including yellows, oranges, reds, and/or blues used alone, together, or in addition to white light emitting devices in source 107. In some cases, the coloring may be a fluorescent color (e.g., a day glow type color(s)) to achieve a desired result such as a feel of heat or raised temperature associated with a real flame. White or colored light spot 127 on element 125 reflects light having a color dependent on both the color of the light produced by light source 107 and the color of the surface of silhouette element 125 where the light spot 127 falls. As silhouette element 125 moves in space with kinetic displacement, $D2_{Kinetic}$, of pendulum member 121, its angle with respect to light source 107 continuously changes and, in response or concurrently, the intensity of the reflected light changes in a complex, kinetic manner. This effect can be modified when silhouette element 125 is distorted or three dimensional in configuration. To get front and back lighting with one source 107, the element 125 (and its coloring/materials) may be chosen such that a portion of the received light 108 is reflected and a portion is allowed to pass through to an opposite or back side. For example, the texture, color, and/or material of the element 125 may be such that about 40 to 60 percent of the light (e.g., about half) is reflected while the remaining light (e.g., about half) is passed through with the element 125 being at least partially translucent. In this manner, both the front and back of the display element 125 is lighted by light 108 from a single source 107.

FIG. 2 schematically illustrates a simple drive device 200 in accordance with an embodiment of the present invention such as for use with kinetic flame device 100 (with components of flame device 100 having like numbers in drive 200). In the implementation of FIG. 2, a power source 201 is provided that may include batteries, an AC/DC power supply, solar power supply, or a combination or variant thereof that produces power of sufficient voltage, current, and frequency content for use by light source or engine 107 and signal generator 203. In some exemplary embodiments, both light engine 107 and signal generator 203 are driven by direct current and are not explicitly managed or controlled. Alternatively, a controller circuit (not shown) may be included and operated to vary the output to light engine 107 and/or signal generator 203 to produce varied results.

In one embodiment, signal generator 203 generates a sinusoidal output in the exemplary embodiments, but, in other cases, it may produce a square wave, pulse modulated, amplitude modulated, frequency modulated, or other output form with expected effect on the electromagnetic field, $M_1$, produced by coil 101. In one preferred embodiment, the generator 203 provides a square wave that is intermittently interrupted (e.g., every so many pulses (such as 32 pulses) it drops off and then restarts after a pause/interruption to enhance the chaotic effect). In another exemplary implementation, signal generator 203 is similar to a conventional clock circuit producing a 60 Hz sinusoidal output coupled to coil 101. When multiple coils 101 are used, signal generator 203 may be adapted to produce multiple outputs that may be synchronous or asynchronous. It is contemplated that when power source 201 is coupled to AC mains or a line source that a simple transformer may be used to produce a desired waveform for coil 101 and eliminate need for signal generator 203.

Figure 3:
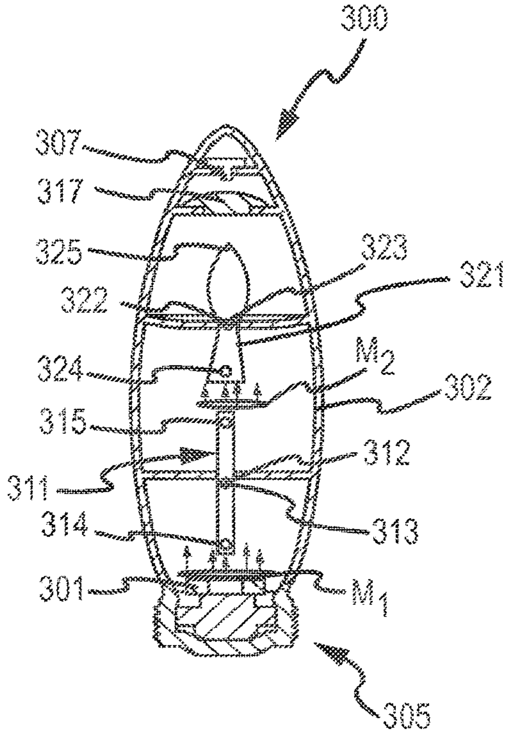
FIG. 3 shows a cross section of an alternative embodiment of a kinetic flame device in accordance with the present invention.
Figure 4:
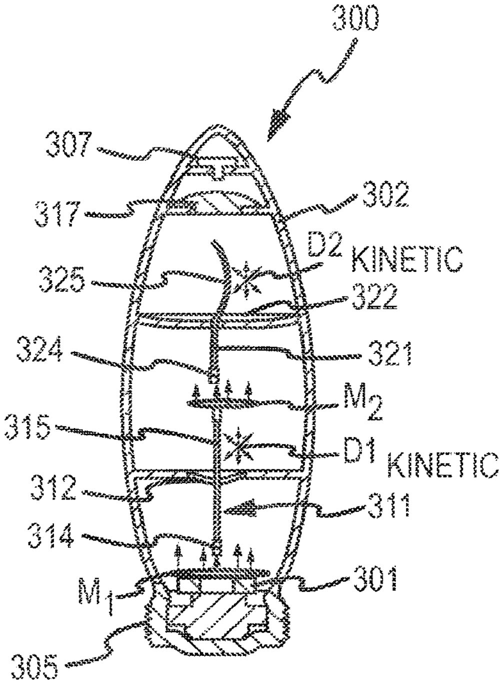
FIG. 4 shows the embodiment of FIG. 3 at a different perspective such as rotated about 90 degrees.

FIG. 3 and FIG. 4 show an alternative embodiment of kinematic flame device 300 in which a mechanism in accordance with the present invention is embodied in a form factor that is compatible with standard light fixtures with standard light sockets. As such, the embodiment 300 shown in FIG. 3 and FIG. 4 enables a screw-in replacement for conventional bulbs that transforms a conventional lighting fixture into a bulb or device with a flickering candle-like flame appearance. FIG. 3 and FIG. 4 show the same embodiment of device 300 from perspectives that differ approximately orthogonally. Like numbered elements correspond to similar elements in the two figures. In general, the materials, construction and operation of the embodiment shown in FIG. 3 and FIG. 4 are analogous to that described in reference to the stand-alone candle implementation of FIG. 1 (e.g., with interaction of magnets and an electrically generated magnetic field used to create a first kinematic motion/displacement that is then passed to a second stage pendulum member via interaction between two permanent magnets).

A bulb base 305 is configured to electrically couple to a light socket such as a standard screw-in type bulb base. However, the invention is readily adapted to other types of bulb bases including two prong press fit, bayonet, candelabra base, miniature screw, and varieties of bases used for halogen and low voltage lighting systems. Housing 302 comprises a transparent or translucent material such as plastic or glass and is used to provide the first and second stages described with reference to device 100 of FIG. 1. Unlike conventional bulbs it is not necessary to maintain reduced pressure within the bulb (within housing 302), so a wider variety of materials and construction technology can be used for the present invention as compared to conventional bulb technology. However, it may be desirable in some implementations to contain a gas within housing 302 or its sidewall(s) or to contain reduced pressure within bulb 302. In such an embodiment of device 300, an airtight seal between base 305 and housing 302 may be provided. Housing 302 (or at least its translucent sidewall(s)) may be coated with a colored film, a fluorescent or phosphorescent film, or other coating either in whole or in part, in a gradient, as well as in a regular or irregular pattern to meet the needs of a particular application 300.

Although not shown in FIG. 3 and FIG. 4, devices to implement the functionality of power source 201 and signal generator 203 can be embedded in base 305. A typical embodiment in accordance with the invention uses low power as compared to conventional light bulbs, and the components necessary to implement that functionality can be very small and readily assembled within or integrated with base 305 and coupled to drive coil 301. Lower or first stage pendulum member 311 moves about a pendulum support 312 that extends through hole 313 in member 311. The pendulum member 311 has a lower magnet 314 and an upper magnet 315 that are analogous in position, function, composition, and construction to lower magnet 114 and upper magnet 115 described in reference to FIG. 1. Operation of pendulum member 311 is analogous to the movement and operation of pendulum 111 shown in FIG. 1, with lower magnet 314 being driven by magnetic field, $M_1$, by coil/components embedded in base 305. A magnetic field, $M_2$, produced by upper or second magnet 315 is coupled to a lower magnet 324 on upper pendulum member 321. Upper pendulum 321 is attached to or integrated with a flame silhouette 325 and operates in a manner akin to upper pendulum 121 in FIG. 1 with a support element 322 extending through hole 323 to pivotally mount the pendulum member 321.

In operation, a light source 307 such as an LED receives power from conductors (not shown) running up from power supply 201 in base 305. These conductors may run along the interior or exterior wall of housing 302. Light output from light source 307 is formed into a spot of desired size and directed downward onto a surface of flame silhouette 325 (as discussed, for example, with reference to device 100) such as with lens/concentrator 317. Alternatively, the light output from light source 307 can be redirected using reflectors formed on the interior surface of housing 302 so that the light reflects and is directed towards flame silhouette 325 at an angle. Light source 307 may also be located in base 305 and directed upward either directly or using reflectors to form a spot on the surface of flame silhouette 325. For example, by making the upper end of housing 302 reflective with a parabolic or other convex shape it will have a focal point which can be adjusted to occur at a location where the light spot is desired. A relatively diffuse light source 307 located in the vicinity of base 305 will transmit diffuse light upward which is then concentrated into a spot occurring at flame silhouette 325.

Figure 5:
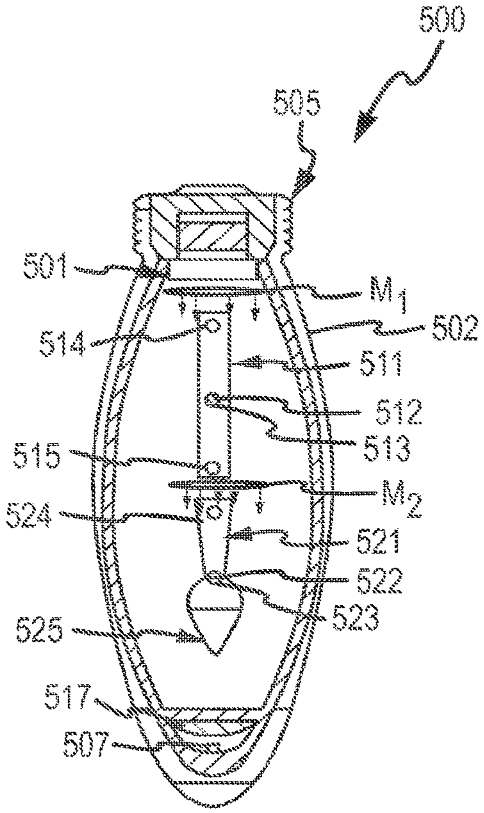
FIG. 5 shows a cross section of another alternative embodiment of a kinetic flame device in accordance with the present invention.
Figure 6:
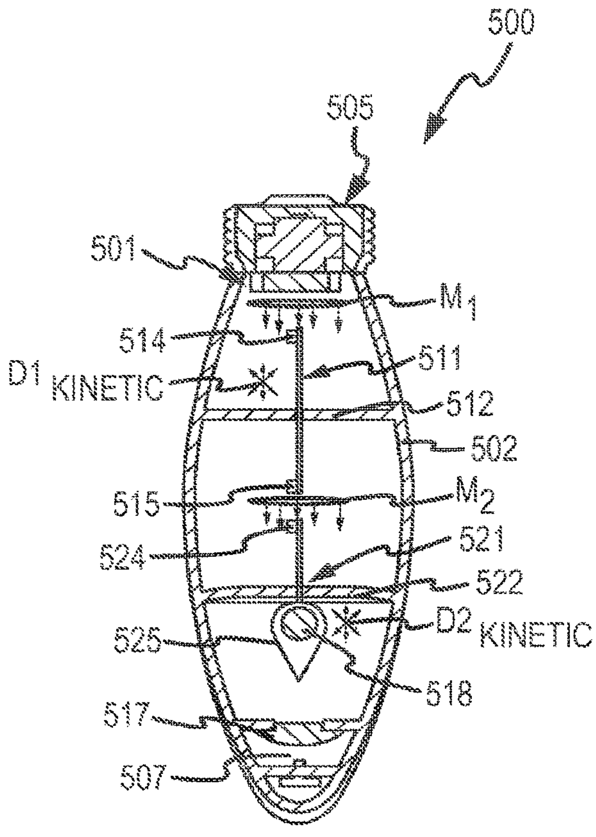
FIG. 6 shows the embodiment of FIG. 5 at a different perspective such as rotated about 90 degrees.

FIG. 5 and FIG. 6 show an alternative embodiment in which a mechanism/device 500 in accordance with the present invention is embodied in a form factor that is compatible with standard light fixtures with standard light sockets, but in which the mechanism 500 is arranged so that the base 505 is above the kinetic movement mechanism (first and second stage arrangement for transmitting kinetic motion via magnetic field interactions through pivotally mounted pendulum members) that provides driving motion of a flame silhouette element 525. FIG. 5 and FIG. 6 show the same embodiment from perspectives that differ approximately orthogonally. Like numbered elements correspond to similar elements in FIG. 5 and FIG. 6. Like the embodiment shown in FIG. 3 and FIG. 4, the embodiments of FIG. 5 and FIG. 6 desirably enable a screw-in replacement for conventional bulbs that transform a conventional lighting fixture into a flickering candle-like flame appearance. In general, the materials, construction and operation of the embodiment shown in FIG. 5 and FIG. 6 are analogous to that described in reference to the stand-alone candle implementation of FIG. 1 and the bulb implementations of FIG. 3 and FIG. 4.

A bulb base 505 is configured to electrically couple to a light socket such as a standard screw in type bulb base, although the invention is readily adapted to other types of bulb bases including two prong press fit, bayonet, candelabra base, miniature screw as well as varieties of bases used for halogen and low voltage lighting systems. Housing 502 includes a transparent or translucent material such as plastic or glass. Unlike conventional bulbs, it is not necessary to maintain reduced pressure within the bulb housing 502, so a wider variety of materials and construction technology can be used for the present invention as compared to conventional bulb technology. However, it may be desirable in some implementations to contain a gas or to contain reduced pressure within bulb 502 in which case an airtight seal between base 505 and housing 502 may be provided. Housing 502 may be coated with a colored film, a fluorescent or phosphorescent film, or another coating either in whole or in part, in a gradient, as well as in a regular or irregular pattern to meet the needs of a particular application.

Devices to implement the functionality of power source 201 and signal generator 203 may be embedded in base 505 in some embodiments, e.g., to selectively generate driving magnetic field, $M_1$. A typical embodiment 500 in accordance with the invention uses low power as compared to conventional light bulbs, and the components necessary to implement that functionality can be very small and readily assembled within or integrated with base 505 and coupled to drive coil 501. First stage pendulum 511 moves about a pendulum support 512 extending through hole 513 to pivotally mount or support pendulum 511. The pendulum 511 has a first or "lower" magnet 514 and a second or "upper" magnet 515 that are analogous in position, function, composition, and construction to lower magnet 114 and upper magnet 115 described in reference to FIG. 1, e.g., first magnet 514 interacts with magnetic field, $M_1$, to create kinetic displacement or motion, $D1_{Kinetic}$, of pendulum 511. Operation of pendulum 511 is analogous to the movement and operation of pendulum 111 shown in FIG. 1. A magnetic field, $M_2$, produced by upper magnet 515 is coupled to a lower magnet 524 on upper pendulum 521 to cause it to move chaotically or with kinetic/random displacement or motion, $D2_{Kinetic}$. Upper pendulum 521 is attached to or integrated with a flame silhouette element 525 and operates in a manner akin to upper pendulum 121 in FIG. 1 as it is pivotally mounted via hole 523 through which support element 522 extends. Flame silhouette element 525 may include an inverted cone that may be, for example, a hollow blow molded part (e.g., a 3D body in this example).

In operation, a light source 507 such as an LED receives power from conductors (not shown) running down from power supply in base 505. These conductors may run along the interior or exterior wall of housing 302. Light output from light source 507 is formed, such as by lens/concentrator 517, into a spot 518 of desired size and directed upward onto a surface of flame silhouette 525. Alternatively, the light output from light source 507 can be redirected using reflectors (not shown) formed on the interior surface of housing 502 so that the light reflects and is directed towards flame silhouette 525 at an angle. Light source 507 may also be located in base 505 and directed downward either directly or using reflectors to form a spot on the surface of flame silhouette element 525.

The present invention is amenable to many variations in implementation to meet the needs of a particular application. The form factor, for example, can be altered to serve as a nightlight, table light, wall sconce, or any form factor where a flickering flame light output is desired. The invention may be applied in fixed and portable outdoor lighting, ceiling mounted fixtures, wall mount fixtures, landscape lighting, holiday lighting, handheld lighting, and the like. Additionally, a number of the kinetic flame elements as shown as 100 in FIG. 1 may be driven by a single assembly that includes a signal generator and power source and that may be plugged into a wall socket or other power source.

Multiple light sources may be used, and the effect in accordance with the present invention may be enhanced by light sources on or in the flame silhouette element to directly emit light in addition to or in place of light projected onto the silhouette element. Other optical elements may be included in the light path from the light source such as scattering devices, reflectors and masks to shape the light source. Similarly, the device housing can be augmented with scattering devices, reflectors, and masks to alter the light reflected from the flame silhouette.

In one embodiment, the kinetic flame assembly 100 is positioned within an outer housing or cup that supports the first and second stage housings 102, 104. These housings may be replaced by a single internal support such as a candle-shaped column that may be useful when the outer housing or cup is formed of optically clear/translucent material such that the "candle" is visible to a user, and the candle-shaped support may have an inner shaft or channel in which the pendulums 111, 121 are supported as shown in FIG. 1 or at some offset, e.g., the support 123 may be rotated relative to the support 113 such these supports 113, 123 are not generally parallel but are at some angular offset such as being transverse or even orthogonal when viewed from above or below. In some implementations, the magnetic/ferromagnetic tags/components 114, 115, 124 are provided on the body of the pendulums 111, 121 while in some cases it may be useful to have these extend from the pendulum bodies such as by having a magnet holder that is rigidly or pivotally supported by a bottom portion of the upper pendulum 121 or the like. The light source 107 may be an LED or similar device, and one or more lenses may be positioned between the light source 107 and the flame 125 to shape the light 108 to achieve a particular effect (e.g., to be about the size and/or shape of the flame 125). The cup/outer housing may include a valance above the candle-shaped column to support the light source/lens 107 and to also hide these from view from a user (e.g., this valance may be opaque such as with a decorative chrome or other exterior coloring so as to disguise the presence of light source 107).

Figure 7:
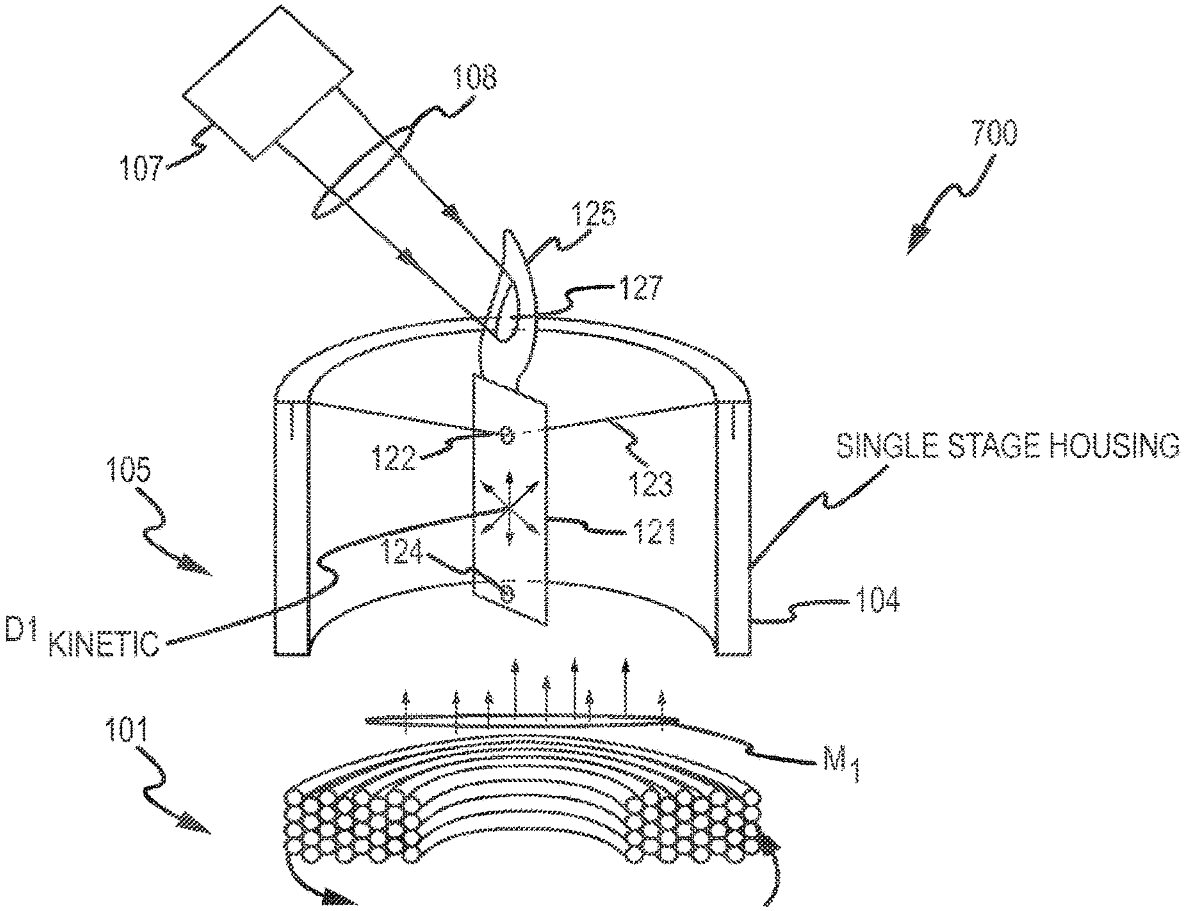
FIG. 7 shows a cut-away perspective view of another embodiment of a kinetic flame effect device similar to that shown in FIG. 1 with a single stage providing kinetic movement of a flame silhouette element.

As discussed above with reference to FIG. 1, the invention can be implemented as a unitary, single stage body instead of using two stages as shown in FIG. 1. Generally, this may be achieved by removing the first stage 103 from the assembly 100. FIG. 7 shows a cut-away perspective view of a single stage embodiment of a kinetic flame device 700 in accordance with the present invention that resembles a conventional wax candle such as a pillar, taper, container candle, votive, tea light and the like depending on the scale and dimensions of the particular application. In the device 700, a single pendulum member 121 is provided with a magnet (or ferrous member) 124 on one end (the lower end) and with a flame silhouette element 125 on the other end (or upper end). This device may derive more of its motion from the nature of the varying electromagnetic field, $M_1$, and, as a result, the device 100 may benefit from a more complex EM field and driver 101. However, the device 100 may be useful for providing a more robust and less expensive assembly.

As with the device 100, a drive mechanism 101 is provided that acts to create a time-varying magnetic field, $M_1$. Drive mechanism 101 at the base of the embodiment in FIG. 1 includes a wound wire coil, for example. In some embodiments, permanent magnets (not shown) may be integrated in, placed on the surface of, or otherwise placed in proximity to coil 101 to provide a static magnetic field that is cumulative with the time varying electromagnetic field produced when coil 101 is energized (as shown in FIG. 2). Although a single coil 101 is shown in FIG. 7 (and as discussed with reference to FIG. 1), it is contemplated that two or more independently or synchronously energized coils may also be used that are distributed symmetrically or asymmetrically about a central axis of the candle device (e.g., an axis that extends upward through the single stage housing 104 and in some cases through pendulums or pendulum member 121).

In operation, coil 101 is energized by a time-varying electric current to produce a time-varying magnetic field, $M_1$, in the vicinity of coil 101. In some embodiments, core material is used to focus and direct the magnetic field that is produced and to alter the power requirements for the operation of the present invention. In the same or other embodiments, permanent magnets are used in or near the coil 101 to superimpose a static magnetic field on top of the time-varying field, $M_1$, created by energizing coil 101. The additional static magnetic field may be used to alter power requirements as well as to selectively modify or define the shape of the magnetic field, $M_1$, in the vicinity of coil 101.

The single stage 105 serves to translate the time varying electromagnetic field, $M_1$, produced by coil 101 into kinetic motion, $D1_{Kinetic}$. The stage 105 is positioned such that at least its base is within the electromagnetic field, $M_1$, produced from coil 101 and elements within single stage 105 are magnetically coupled to coil 101 when its electromagnetic field, $M_1$, is present. Specifically, a magnet 124 positioned or mounted at a lower end of pendulum or single stage pendulum member 121 is within the time varying electromagnetic field, $M_1$. Magnet 124 is preferably a small permanent magnet with sufficient magnetic field strength to be moved in response to either repulsive or attractive forces resulting from interaction with the time varying electromagnetic field, $M_1$, produced by coil 101 such that the pendulum member 121 is displaced in a random or kinetic manner as shown with arrows $D1_{Kinetic}$. For example, the pendulum member 121 may have an elongate body such as a thin planar design with a rectangular, elliptical, or other shape that may be formed of plastic or other non-ferrous material (e.g., a plastic rectangle with a width of about 0.25 to 2 inch width, a length of about 0.5 to 4 inches, and a thickness of 0.2 inches or less). The displacement, $D1_{Kinetic}$, may vary widely to practice the invention but may be a random pattern with movements of up to 0.5 inches or more in any direction from an original or at rest position.

Single stage housing 104 may be generally tubular in shape with a sidewall defining an interior space or void for containing the pendulum member 121 and an interaction space or area for the magnetic field/forces, $M_1$, and the magnet 124 of pendulum member 121. The housing 104 may have a sidewall formed of plastic, glass, ceramic, molded epoxy, or other material that can be formed into a desired shape for the particular application. Single stage 105 generally serves to translate the magnetic field/forces, M1, (that cause its lower end via magnet/ferrous tag 124 to move chaotically) into kinetic energy or motion of flame silhouette element or extension 125.

Single stage pendulum member (or flame body) 121, which is slightly shorter than the length of housing 104, is pivotally mounted via a pivot hole 122 on a pendulum support element 123, e.g., a rigid or semi-rigid wire or the like in some embodiments with a lower supporting portion or area in the center of the element 123. The support element 123 is mounted at each end to the sidewall of the housing 104. The magnet 124 (similar in composition, size, and alignment to the first or lower magnet 114 of the first stage pendulum member 111 and second or upper magnet 115 of the first stage pendulum member as described hereinbefore with regard to FIG. 1) is mounted at a lower (or first) portion or end of pendulum member 121. Magnet 124 is positioned so as to be magnetically coupled to or influenced by magnetic field or forces, $M_1$. The magnetic coupling, $M_1$, is preferably repulsive, but it may also be attractive or a mix between attractive and repulsive coupling. For example, in one useful implementation, the magnetic couplings are attractive, and gravity is used to bring the pendulum members back to a central or neutral position. In use, the coil in such a case may provide a donut shaped magnetic field such that attractive magnetic coupling provides an auto-start upon power up as it moves the nearby pendulum away from the neutral position.

Flame silhouette element 125 includes a flat or dimensional body of material preferably formed with a flame-shaped outline or peripheral pattern. Flame silhouette element 125 extends outward from an edge or side of the upper (or second) portion/end of the second stage pendulum member 121. Element 125 may include a sheet of material such as paper or plastic and/or is formed of the same or differing material as the body of pendulum member 121. Flame silhouette element 125 may be two dimensional or a distorted sheet material that extends in three dimensions, or may be a fully three dimensional object. The mass and air resistance of flame silhouette 125 adds to the mass and air resistance of pendulum 121 and so its configuration is typically taken into consideration when locating pivot hole 122 relative to the upper or second end of the pendulum member 121.

In operation, the extent or magnitude of motion or kinetic displacement of the lower end of pendulum 121 is greater than the extent of motion of the upper end of pendulum 121 to a degree determined by the position of hole 122 relative to the edge of the upper portion of pendulum 121 (e.g., the kinetic displacement, $D1_{Kinetic}$, has a larger component in the lower or first end/portion of the pendulum 121 than in the upper or second end/portion of the pendulum 121 such as 2 to 4 times as much movement or the like in the lower or first end/portion). In some embodiments, pivot hole 122 is provided at a location comparable to the base of a wick in a combustion candle (e.g., 0.1 to 1 inch or more below upper lip or edge of the second stage housing 104).

Gravity tends to return pendulum 121 to an upright position whereas the magnetic influence, $M_1$, continuously perturbs pendulum 121 and inhibits a steady state return to the upright position. Air resistance acting on the surface area of pendulum member 121 and flame silhouette element 125 damps the motion, $D1_{Kinetic}$, of pendulum member 121. Accordingly, the size and shape of pendulum member 121 can be altered to provide the speed and degree of kinetic movement, $D1_{Kinetic}$, desired for a particular application or embodiment of device 700. The device 700 may include a flame silhouette element 125 that is shaped as a simple geometrical shape such as a triangle, circle, or arbitrary shape to produce a desirable effect while the illustrated element 125 has a shape or peripheral pattern similar to a candle or solitary flame.

In the particular implementation 700 of FIG. 7, a spotlight 107 mounted above flame silhouette 125 is aimed to direct light 108 toward the element 125 to produce a spot of light 127 on the surface of flame silhouette element 125. One or more light sources 107 may be used, and, when used, the multiple light sources may be aligned so that their produced spots of light 127 are aligned with each other in the vicinity of silhouette element 125 even as silhouette element 125 moves in normal operation with the kinetic movement, $D1_{Kinetic}$, of single stage pendulum member 121. As silhouette element 125 moves in space with kinetic displacement, $D1_{Kinetic}$, of pendulum member 121, its angle with respect to light source 107 continuously changes and, in response or concurrently, the intensity of the reflected light changes in a complex, kinetic manner.

In the above description, it was explained that it may be useful in some embodiments or applications to have the light source project upward (or from within the device body or housing interior) onto the flame silhouette element. It was also discussed that some embodiments may utilize additional magnet elements to shape or alter the movements of the pendulum elements such as by providing permanent magnets near the drive mechanism 101 or by placing magnets at one or more locations within the interior of the housings 102, 104. Briefly, some embodiments may include a pillar-style or bulb-style kinetic flame device where the flame member is lit from below (or from within the housing). A downside of such an implementation may be blow by of light that is visible from above, but, for a wall sconce or lighting that is above the viewer, such from-below lighting may provide a useful or even more pleasing effect.

Figure 8:
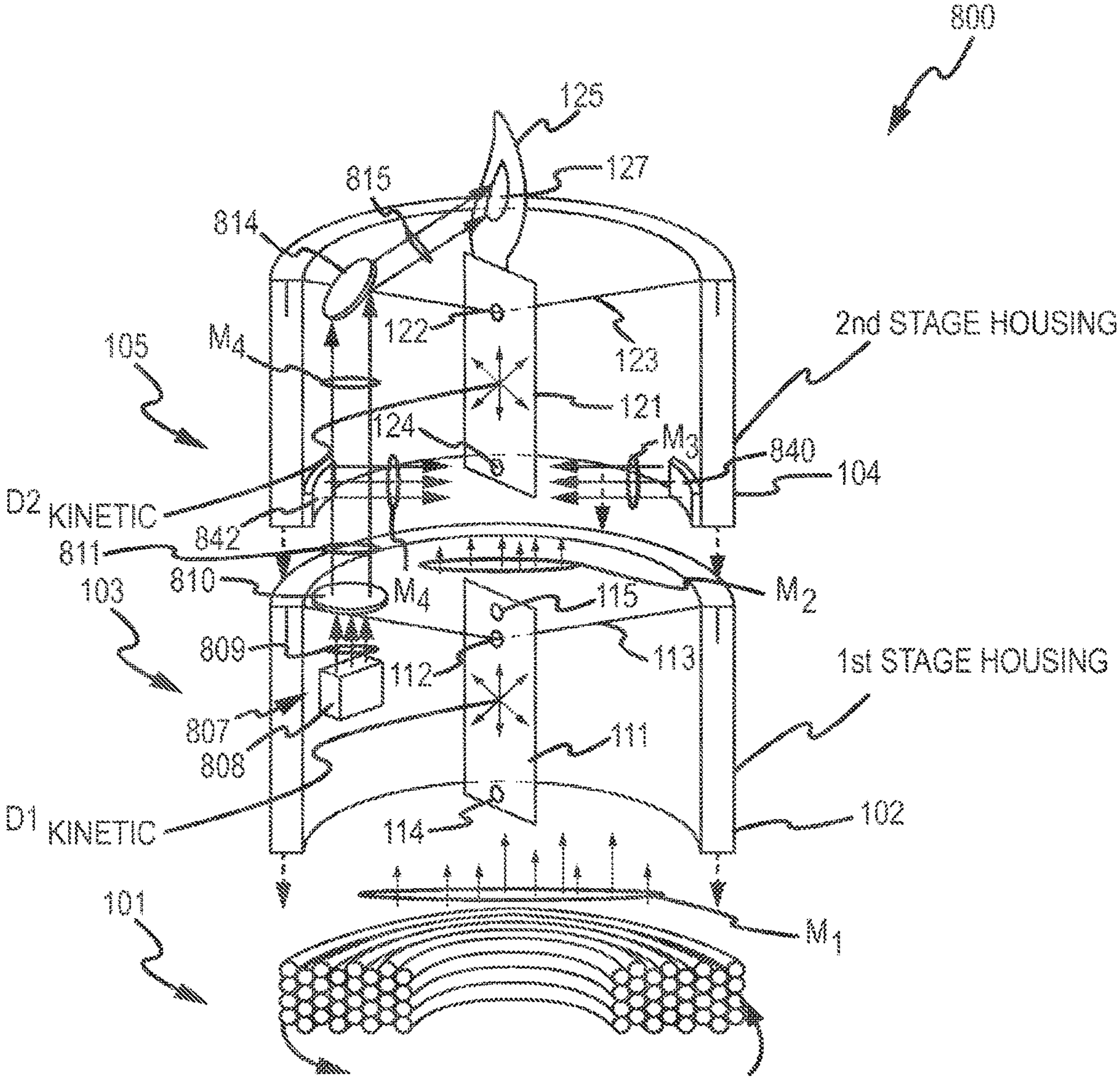
FIG. 8 shows a cut-away perspective view of an embodiment of a kinetic flame effect device similar to that shown in FIGS. 1 and 7 (and its aspects may be used in a single stage or two or more stage device) showing use of housing-contained lighting as well as the use of sidewall magnets to shape and/or effect kinetic movement of the flame body or upper pendulum member.

FIG. 8 illustrates a kinetic flame device 800 that includes components similar to those shown in the device 100 of FIG. 1 but modified to utilize a from-below or in-housing lighting assembly 807 and to also include side-mounted (or interior-placed) magnetic elements 840, 842 to alter the movement of the upper pendulum member 121. In some embodiments, only one of these two new aspects may be utilized and the number or specific location of these components may be varied to practice the device 800 (e.g., only use one magnet 840, 842 or use more magnets, place the magnets either higher or lower in the housing 104 or within housing 102, use more than one light source 808, use the light source 808 in combination with the light source 107 of FIG. 1, and so on).

In the embodiment shown in FIG. 8, the device 800 lights flame silhouette element 125 from below (or from the interior space defined by housings 102, 104) using a lighting assembly 807 that is mounted within the interior space of housings 102, 104. The lighting assembly 807 includes a lighting source 808 (such as a monochromatic LED or multiple color LED or the like) that is mounted on the inner surface of first stage housing 102 (but may, in some embodiments, be placed apart from the housing sidewall or in second stage housing 104). The lighting source 808 projects light 809 upward (e.g., in a funnel or light source housing as shown) where it is focused in this embodiment by lens 810 to provide focused light 811, which may be focused to provide a beam(s) of light 811 about the size/shape of spot 127 (e.g., smaller in size than about the size/shape of element 125 to limit blow by out of the device 800).

The lighting assembly 807 may also include a reflector or mirror 814 that is configured to reflect or redirect the light 811 as shown at 815 on to the element 125 to provide illuminated spot 127. The mirror 814 may be positioned near the top of the second stage housing 104 such that the light 815 is striking the flame silhouette element 125 at an incidence angle that is nearer orthogonal to further limit blow by such as at an angle over 45 degrees such as 60 to 80 or more degrees. In some embodiments, though, the mirror 814 is not included and the light 811 is focused by the lens 810 directly onto the element 125.

In addition to the drive mechanism 101 (e.g., an EM coil) providing time-varying magnetic field, $M_1$, the kinetic flame device 800 includes magnets 840, 842 positioned within the interior of device 800 defined by housings 102, 104. As shown, the magnets 840, 842 are side-mounted magnets (e.g., permanent magnets, electromagnetic devices, or the like) that generate magnetic fields $M_3$ and $M_4$ to effect the kinetic movements, $D2_{Kinetic}$ of the upper pendulum member 121. The magnets 840, 842 may be affixed to the inner surfaces of second stage housing 104 proximate to the lower end of the pendulum 121 and magnetic member or ferrous tag 124.

The magnets 840, 842 may be positioned opposite each other as shown or offset to achieve a desired result. In some embodiments, the magnetic fields, $M_3$ and $M_4$, are of equal strength but in opposite directions such that the magnetic fields, $M_3$ and $M_4$, both act to similarly repel (or attract) the magnet 124, which may have a north (or south) pole facing one magnet 840 and a south (or north) pole facing another magnet 842. In this manner, the kinetic movement, $D2_{Kinetic}$, may be dampened (or amplified) when compared to its magnitude in response only to magnetic field, $M_2$. In other embodiments, three or more magnets are positioned on the inner surfaces or in the interior of housing 104 to create a desired movement, $D2_{Kinetic}$, of upper pendulum 121 and flame element 125, with the strength of the magnets being similar in some cases and differing in others. In other embodiments, a single magnet 840 or 842 is used in the device 800. The magnets 840, 842 may be permanent magnets in some embodiments while others may utilize electromagnetic coils similar to that used for drive mechanism 101 such that the fields, $M_3$ and/or $M_4$, may be varied over time and/or turned completely on or off to change the movement, $D2_{Kinetic}$.

As shown, the kinetic flame device 800 includes magnets 840, 842 on sides of a candle body such as on second stage housing 104. The inclusion of magnets 840, 842 creates static magnetic fields, $M_3$ and $M_4$, when the magnets 840, 842 are permanent magnets or a non-time varying EM device is used. The static magnetic field(s) can be used to aid the chaos and to interact with the dynamic magnetic field, $M_2$. Static magnets 840, 842 may be shaped (or selected so as) to produce a shaped magnetic field, $M_3$ and $M_4$, to more effectively dampen, heighten, or otherwise modify the magnitude of the kinetic movement, $D2_{Kinetic}$, or its chaotic nature (e.g., make the movement, $D2_{Kinetic}$, more unpredictable). The use of permanent magnets for magnets 840, 842 may allow the drive mechanism 101 to only be operated periodically such as to initiate kinetic movement, $D2_{Kinetic}$, followed by a period where movement, $D2_{Kinetic}$, is only caused by the momentum of the pendulum 121 and fields, $M_3$ and $M_4$, on magnet/tag 124. After a period of time, the drive mechanism 101 may be restarted to bring kinetic movement, $D2_{Kinetic}$, back up to some desired maximum amount and the drive mechanism 101 then shut down again (and this process repeated on a regular or irregular cycle).

Figure 9:
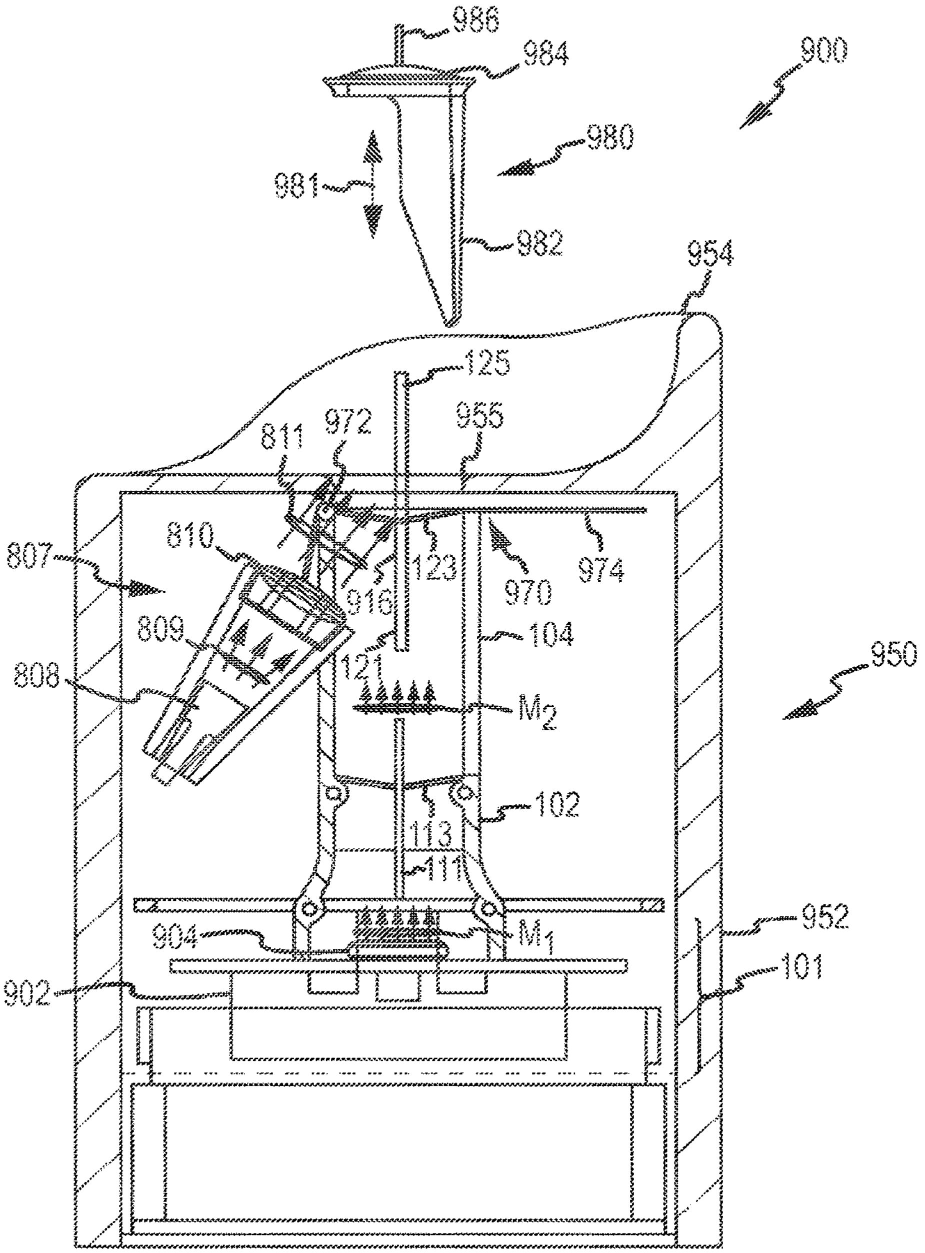
FIG. 9 illustrates one embodiment of a kinetic flame effect device similar to that shown in FIG. 8 further including an outer casing (or candle body) used, in part, to enclose the drive mechanism and its power source (here, a battery) and also showing a retractable flame feature for displaying the candle when it is not operating (e.g., with an unlit wick as expected for a conventional candle), with FIG. 9 showing the device operating (e.g., with the cover/cap in the up position)
Figure 10:
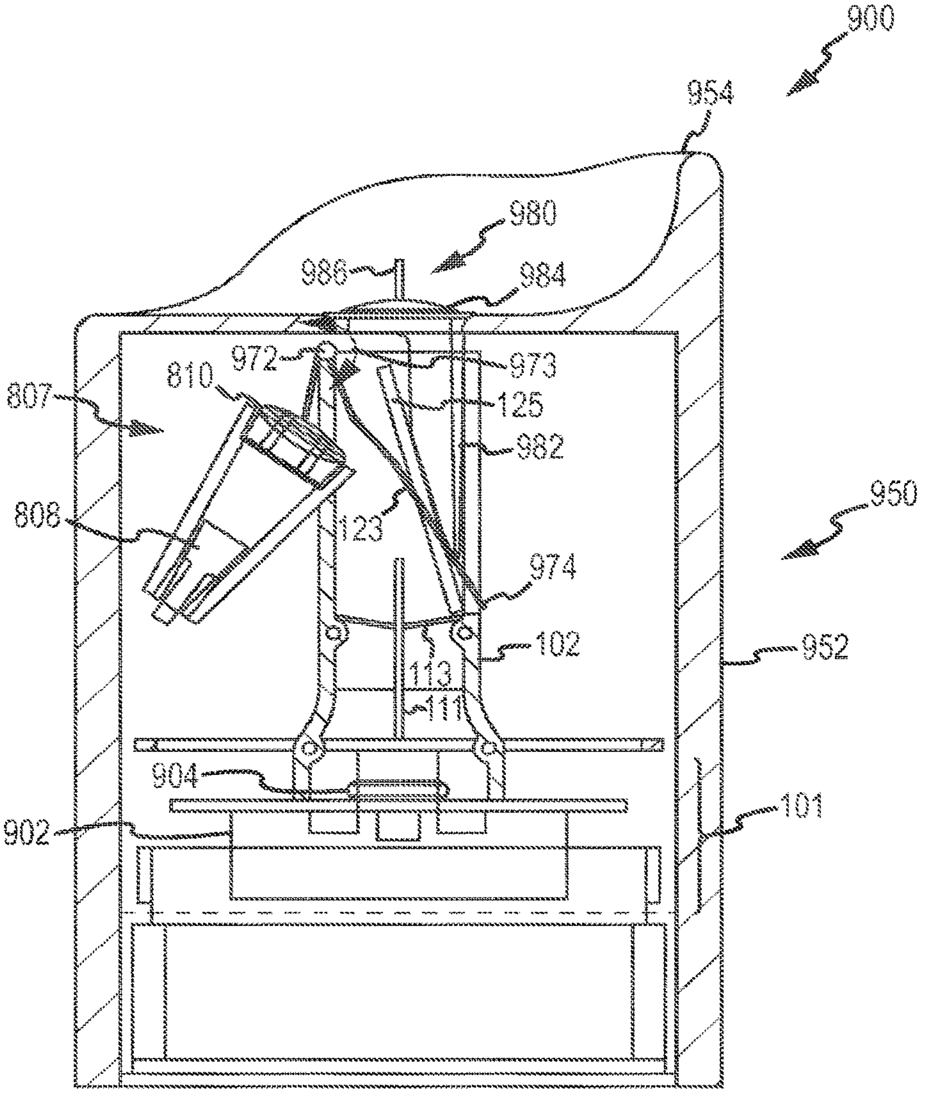
FIG. 10 illustrates the kinetic flame effect device of FIG. 9 in the off mode with the cover/cap in the down position (e.g., with the flame body or upper pendulum member retracted into the second stage housing or simply housing when the two stages are provided in a unitary housing/body)

FIGS. 9 and 10 illustrate a particular implementation of a kinetic flame effect device 900, with FIG. 9 showing the device 900 in an operating or on mode and FIG. 10 showing the device in a non-operating or off mode. The device 900 makes use of components of device 100 of FIG. 1 and device 800 of FIG. 8, and these components have like numbers. For example, the device 900 includes first and second stage housings 102, 104 that may be provided as a unitary, cylindrical structure as shown and are used to define an interior space or volume for containing the lower or first stage pendulum member 111 on support 113 and upper or second stage pendulum member 121 on support 123 (which may be part of flame retraction bar or member 974). Also, the device 900 includes a drive mechanism 101 with power source or battery 902 driving or powering coil 904 to selectively produce time-varying magnetic field, $M_1$, which moves pendulum 111 chaotically (which then uses magnetic field, $M_2$, to couple with pendulum 121 and cause it and flame silhouette element 125 to move chaotically on support 123).

The device 900 further includes an outer casing or candle body 950 to support and hide the other working components/parts of the device 900. The outer casing 950 includes a tubular sidewall 952 that supports the drive mechanism 101 and a housing 102/104 platform such that the stage housings 102 and 104 are centrally positioned within the casing 950. The housings 102 and 104 extend upward from the drive mechanism 101 toward a candle top or cover 954 that may have irregular sidewalls (as shown) simulating melted wax of a conventional wax candle and further include a planar portion with a centrally located opening or hole 955 through which the flame silhouette element 125 may extend. In this manner, of the kinetically moving components, only the flame silhouette element 125 extends outward from the casing 950 and is readily visible by a viewer.

The device 900, as shown for device 800, includes a light assembly or engine 807 positioned within the casing sidewall 952 to illuminate a surface or side 916 of the flame element 125 from below or from within the casing 950 (e.g., from above if a bulb implementation as shown in FIGS. 5 and 6). The light engine 807 includes an LED or other light source 808 operable (as shown) to generate light 809 that is focused by lens 810 to provide focused light 811 to illuminate a spot or all/most of flame silhouette element 125 as it moves with pendulum element 121 in response to varying magnetic field, $M_2$. The hole/opening 955 may be sized and shaped to allow the light 811 to reach the element 125, but small enough that blow by is controlled or limited.

The hole/opening 955 may also purposely block all or portions of the light 811 in a range of positions of the element 125 to further vary lighting of element 125 to cause more of a flickering light effect (e.g., such as to at least partially block light 811 when the silhouette element 125 moves "forward" or to the left from a vertical position as shown in FIG. 9). Hence, the flame element 125 may be more dimly lit (or unlit) in one third to half of its range of movement and brightly lit in the other half to two thirds of its range of movement.

The device 900 is also adapted to allow the flame silhouette element 125 to be retracted below the cover 954 and an unlit wick to be displayed when the device 900 is turned off (or no power is provided to the coil 101 and LED/light source 808 (as shown in FIG. 10)). FIG. 9 illustrates the device 900 with a cover/cap assembly 980 removed from the casing 950. In this position, the retracting assembly 970 uses spring 972 on second stage housing 104 to swing the retraction/positioning bar 974 to an up or raised position where a trailing end or stop may contact the outer sidewall of housing 104 (as shown). A slot (not shown) may be provided in the sidewall of housing 104 to allow the bar 974 to move through a range of movement between the up/raised position shown in FIG. 9 and the down/retracted position shown in FIG. 10. The support member 123 for the flame element 125 may be provided as an integral portion of the bar 974, with the bar 974 being linked to (or formed with) the return/positioning spring 972.

When the device 900 is turned off, the cover/cap assembly 980 may be used to manually retract the flame element 125 and cover/plug the hole/opening 955 of the casing 950. The cap assembly 980 includes an elongated cylindrical body 982 formed with a sidewall that may extend only part way about circumference so as to leave an opening for receiving the flame element 125 and/or pendulum member 121 and retraction bar 974 (e.g., similar in shape to many tent/camping stakes or the like). The cap assembly 980 also includes a cap or top portion 984 extending orthogonally out from body 982, and a wick 986 extending upward or vertically from cap 984. The cap assembly 980 is manually positionable as shown with arrow 981 in FIG. 9 to be inserted into (or removed from) the casing 950.

When the cap body 982 is inserted into the hole 955, its tip or end contacts the retraction bar 974 and pushes the bar 974 downward or into the housing 104. This causes the spring/hinge 972 to rotate 973 about its axis or mounting locations on housing 104. As the retraction bar 974 is moved into the housing 104, the pendulum 121 also is pushed into the housing 104, which causes the attached flame element 125 to be pulled through the hole 955 (or at least partially as it may be desirable for at least a tip or portion of the flame element 125 to extend out of the hole 955 to avoid binding upon removal of cap assembly 980). As shown, the cap 984 has its sides or edges abutting the sides of opening 955 to provide relatively tight/press fit into top 954 of casing 950. In this position, the wick 986 is visible on the top 954 so as to appear as an unlit wick as found in conventional wax candles rather than an unlit flame element 125 (which may diminish the overall candle simulation). The retracting functionality is manual in the device 900 and the cap assembly 980 is removable, but, in other embodiments, the cap assembly 980 is automatically positioned upon powering off of the drive 101 and is retained when not used in the casing 950 such as opposite the light assembly 807.

Figure 11:
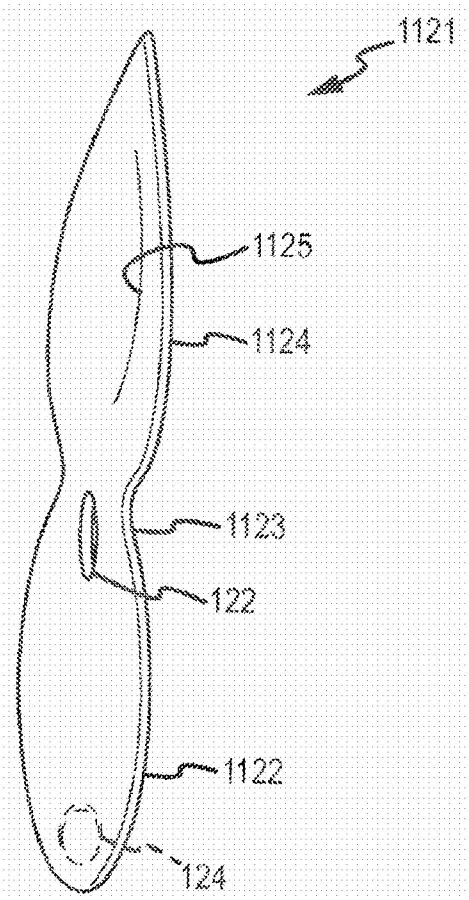
FIG. 11 illustrates one particular implementation of the upper pendulum member or flame body that utilizes an "hour glass" body along with a concave or recessed flame silhouette element to provide a desired kinetic movement of the silhouette element and light reflection/absorption effects.

FIG. 11 illustrates a particular implementation of an upper pendulum member (or single stage pendulum member) 1121 that may be used in the devices 100, 700, 800, and 900. The body of the member 1121 is hour glass in shape. The member 1121 includes a lower, wider portion 1122 that contains the magnet/ferrous tag 124, a narrower middle portion 1123, and an upper wider portion 1124 that may provide the flame silhouette element illuminated by a light engine. The support hole 122 may be provided in the middle portion 1123 or in the end of the lower, wider portion 1122 near the middle portion 1123. The thickness of the element 1121 may be relatively constant throughout in some embodiments or be varied, e.g., to provide a thicker and heavier lower, wider portion 1122. In some cases, the upper, wider portion 1124 that provides the flame silhouette element is concave and/or includes a recessed surface 1125 to provide a more desirable light receiving surface (e.g., to provide a curved portion to receive/reflect light from a light engine/source).

In some embodiments, it may be desirable to simulate a scented candle. In such cases, a scent reservoir or solid scent component (not shown) may be positioned within the housing 102 or in casing sidewall 952. The scent may be released more rapidly when the kinetic flame device such as device 900 is operating as waste heat from the drive mechanism 101 may be used to heat the scent reservoir/component. In other words, the scent component may be positioned on or near the drive mechanism platform or near the coil such that when these components become warmer they also heat the scent component to more rapidly release scented fumes. The scented fumes may also be disseminated by movements of the pendulum members such as lower and upper pendulums 111, 121 with their kinetic movements, $D1_{Kinetic}$ and $D2_{Kinetic}$, fanning the scented fumes about and upward out of the housing 102, 104.

Figure 17:
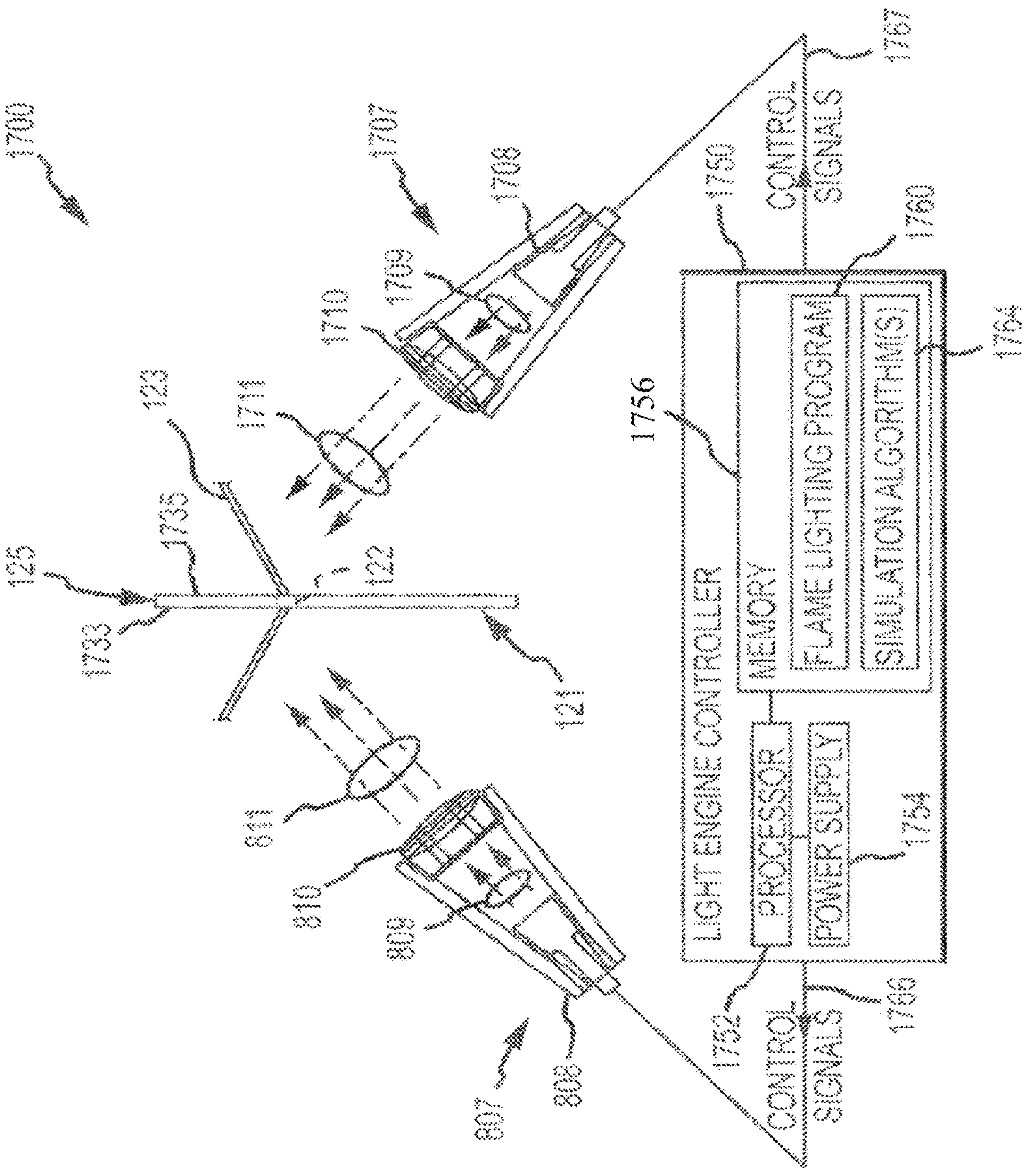
FIG. 17 is a partial view similar to that of FIG. 9 showing schematically the inclusion of two or more light sources/engines along with a light engine controller to selectively operate the light sources to provide an enhanced flame effect device.

As discussed above, some embodiments of kinetic flame effect devices may utilize two, three, or more light sources to achieve a desired flame animation or simulation. FIG. 17 illustrates one such embodiment of a device 1700 that includes a first light source or engine 807 and a second light source or engine 1707. The device 1700 may be considered a modification of the devices 800 and/or 900 of FIGS. 8-10 such that similar elements are labeled with like numbers. In other case, the components of device 1700 such as the light engine controller 1750 may be used in the flame effect devices 100, 300, and/or 500. Generally, the device 1700 is useful for providing two or more lighting assemblies 807, 1707 (such as LEDs) that allow an improved illumination of the flame paper or pendulum member 121 to better or differently simulate a real flame.

For example, the device 1700 may be operated through controller 1750 to vary the intensity (brighter/dimmer) of one or both of the lighting assemblies or engines 807, 1707 or to turn one or both of the engines 807, 1707 off (alternating which is on/off, for example) to create a chaotic lighting of the moving flame element 125 of pendulum member 121. The addition of the second lighting assembly 1707 also achieves a desirable effect by lighting both sides 1733, 1735 of the body of pendulum 121. In some cases, one or both of the lighting assemblies 807, 1707 includes an LED or other light source 808, 1708 that is capable of changing colors and the controller 1750 may control this color changing to achieve a desired coloring of the flame element 125 or of the light reflected from its surfaces 1733, 1735.

As shown, the device 1700 lights flame silhouette element 125 from below (or from an interior space defined by a housing such as housings 102, 104 or 950) using a first lighting assembly 807 and also a second lighting assembly 1707. These assemblies 807, 1707 may both be mounted within the interior spaces of a housing on opposite sides of the housing's interior walls or in other positions to light opposite sides 1733, 1735 of the flame silhouette 125 of pendulum member 121. In some embodiments, though, one or both of the assemblies 807, 1707 is positioned to light the silhouette 125 from above and/or to cause light 811, 1711 to strike a same side 1733 or 1735 (which may be flat/planar or concave).

The light assemblies 807, 1707 each are shown to include a lighting source 808, 1708 that projects light 809, 1709 that is focused or diffused by lens 810, 1710 to provide light 811, 1711 that is projected upon opposite surfaces 1733, 1735 of flame silhouette 125. Each of the light sources 808, 1708 may be LEDs. The LEDs 808, 1708 may be of the same color, e.g., a monochromatic LED, or may be different in color, which may be useful in cases where the body of flame element/silhouette 125 is at least partially translucent (e.g., up to about half (or more) of the light 811, 1711 is transmitted through the material of the element 125) to mix the colors of the two light streams 811, 1711.

In other cases, one or both of the light sources 808, 1708 is a bi-color or multi-color source such as an LED capable of providing light 809, 1709 of two or more colors. In these cases, the sources 808, 1708 may be controlled or operated to switch between the colors to vary the color of the illumination of surface 1733, 1735 over time. For example, the source 808 and/or 1708 may be a bi-color LED that has any two of yellow, orange, or red (or other colors that may even include blue, green, white, purple, turquoise, or the like, which may be flickered more briefly to achieve a particular coloring/lighting effect) LEDs housed near the lens 810, 1710, and each of these colored LEDs may be selectively used to provide light 809, 1709. In other cases, one or both light sources 808, 1708 may be a multi-color LED light bulb that can transition in response to control/driver signals 1766, 1767 through a plurality of color (and brightness) combinations (e.g., the controller 1750 can select an individual color or brightness for light 809, 1710 (which may be the same or different at any particular operating time of device 1700)).

Further, it is typically preferable that the brightness or intensity of the light 809, 1709 may be controlled by the controller 1750 over time to vary the lighting of the surfaces 1733, 1735. For example, one or both of sources 808, 1708 may be switched between on and off (e.g., to flicker or flash or pop). Also, the sources 808, 1708 may be selectively operated to have other brightness transition effects such as strobing, fading in and out in a smooth manner from a minimum (or first) intensity to a maximum (or second) intensity, and the like.

To provide these varying lighting effects, the device 1700 is further shown to include a light engine controller 1750 that is connected to the sources 808, 1708 to provide driving or control signals 1766, 1767 (or may be connected to LED drivers or the like to affect such control over assemblies 807, 1707). The controller 1750 is shown to include a processor 1752 (e.g., a microchip or the like) and a power supply 1754 (which may be the same or different from that used to drive sources 808, 1708). The processor 1752 manages memory 1756 of the controller 1750, which may contain a flame lighting program 1760. The controller 1750 typically is contained within the housing with the lighting assemblies 807, 1707 (such as within the base of a housing proximate to a power source such as a battery).

The program 1760 may take the form of code or software in nearly any programming language that is executed by the processor 1752 to cause it to selectively transmit control signals 1766, 1767 to drive or operate the light sources 808, 1708. For example, the program 1760 may include a simulation algorithm(s) 1764 that is useful for simulating or emulating a real flame with light 809, 1709 by causing the controller 1750 to issue signals 1766, 1767. In some embodiments, the controller 1750 may be replaced with or include manual controls that allow an operator to manually tune the color and/or intensity of the light sources 808, 1708 or to select among algorithms 1764 (e.g., a rapidly flickering candle, a dim and slowly moving flame, a bright and larger flame effect, and so on).

In one embodiment, the pendulum member 121 and its flame element 125 take the form of a sheet of Mylar (e.g., BoPET) or the like that is colored (e.g., plum or the like). Such a metalized film provides reflective surfaces 1733, 1735 that reflect received light 811, 1711 to a viewer or observer of the kinetic flame effect device 1700 in a desirable manner. In this or other embodiments, the simulation algorithm 1764 acts to randomly (or seemingly randomly) transition at least the intensity/brightness of one and, more preferably, both sources 808, 1708 over time.

Typically, one or both sources 808, 1708 provides light 809, 1709 of two or more colors and the control signals 1766, 1767 are generated by controller 1750 to switch the color of light 809, 1709 over time, too, such as transition between orange and white over time. The transitions of sources 808, 1708 may occur concurrently or these transitions may differ over time. For example, the source 1708 may be providing a light 1709 of a first color varying based on a first transition pattern (e.g., rapid flickering white or light blue light) while the source 808 is operated with signals 1766 to provide a light 809 of second and third colors that vary based on a second transition pattern (e.g., a slow fade in and out between yellow and red).

In the above examples of kinetic flame effect devices, the chaos engine or drive mechanism was described as being configured to provide a time-varying electromagnetic field. For example, the drive mechanism 101 in the flame effect device 100 of FIG. 1 created a time-varying magnetic field, $M_1$, that interacted with the lower or first stage pendulum member 111 in the first stage housing 102. In such embodiments, the drive mechanism 101 was typically described as including a coil with or without a magnetic core that was operated to provide the magnetic field, $M_1$.

In other embodiments, however, it may be useful or desirable to replace or supplement such a drive mechanism with one or more differing drive mechanisms or chaos engines that are used to move a pendulum member in a chaotic manner that creates the kinetic flame effect described above. Specifically, the drive mechanism 101 of the devices 100, 300, 500, 700, 800, 900 may be replaced with one or more of the chaos engines or drive mechanism described below.

Each drive mechanism being described in relation to a schematic figure of the mechanism, with the understanding that the drive mechanism may be contained within the housing of the device 100, 300, 500, 700, 800, or 900 so as to be positioned proximate to a particular pendulum member to impart a chaotic or kinetic movement in the pendulum member. For example, the drive mechanism 1201 shown in FIG. 12 may be provided within the sidewall 952 of the device 900 in place of (or in addition to) the drive mechanism 101 so as to selectively drive movement of lower pendulum member 111 to create magnetic field, $M_2$, to move upper pendulum member 121. Hence, the following discussion concentrates mainly upon the drive mechanism components rather than repeating discussions of the arrangement of the pendulum members, the selective lighting of flame silhouette elements, and other components of the overall kinetic flame effect devices that would work in cooperation with the following drive mechanisms to provide useful kinetic flame devices.

Figure 12:
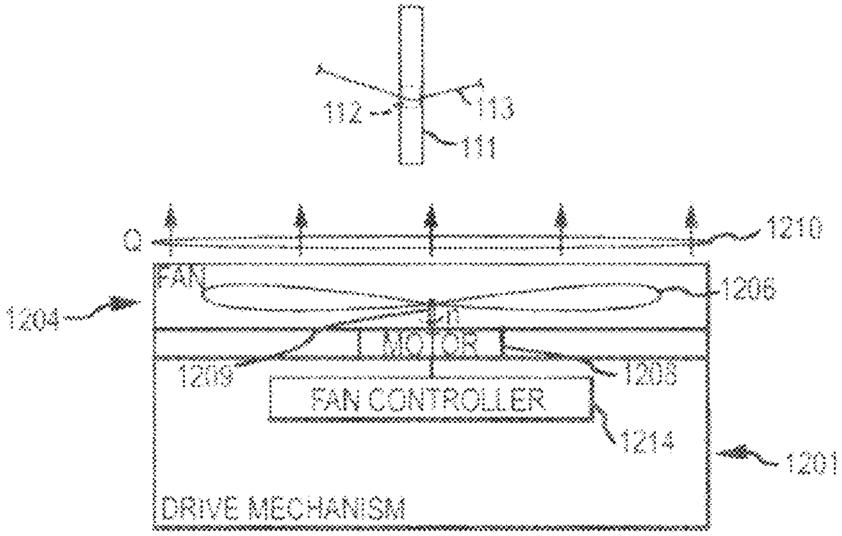
FIG. 12 is a schematic illustration of a fan-based chaos engine or drive mechanism that may be used with any of the kinetic flame effect devices described herein.

FIG. 12 illustrates a drive mechanism 1201 that may be used in any of the kinetic flame effect devices described herein, and the drive mechanism 1201 may be considered to be a fan or airflow-based chaos engine. To this end, the drive mechanism 1201 includes a housing support a fan 1204, and the fan 1204 is used to move the pendulum 111 with airflow 1210 rather than with a magnetic field (e.g., the field, $M_1$, is removed and the pendulum such as pendulum 111 would not need the lower magnetic coupling member 114). The fan 1204 has a blade 1206 that can be rotated as shown at 1209 at a particular rate or fan speed, n (e.g., a particular number of revolutions per minute (RPM)) by a motor 1208. The motor 1208 is in turn operated or controlled by a fan controller 1214. The drive mechanism 1201 is positioned in a housing of a flame effect device (such as device 100 of FIG. 1) so as to provide its output airflow 1210 to flow over a pendulum member of the device. The lower pendulum member 111 is shown in FIG. 12 (as well as the following figures), but the drive mechanism 1201 may also be used to chaotically move other pendulum members such as members 311, 511, 121 (of FIG. 7).

To this end, the output airflow 1210 has a volume flow rate, Q (e.g., cubic feet per minute (CFM)) that causes the pendulum member 111 to move. To create chaotic movement of member 111 on support 113, the fan controller 1214 may use a counter/oscillator circuit, a switching circuit, and the like to change the fan speeds, n, to create airflows 1210 with varying volumetric flow rates, Q, over an operating period of a device including the drive mechanism 1201. The changes in the fan speed, n, typically will be done in rather irregular or random manner so as to cause the member 111 to move chaotically rather than to become fixed in differing positions or to move in a predictable manner. The fan controller 1214 may also turn the motor 1208 on and off to vary the output flow 1210 to cause the movement of the pendulum member 111 to be more chaotic (or to achieve a desired flame effect or movement of a magnetically coupled member 121 to move in response to kinetic movement, D1, of member 111).

Figure 13:
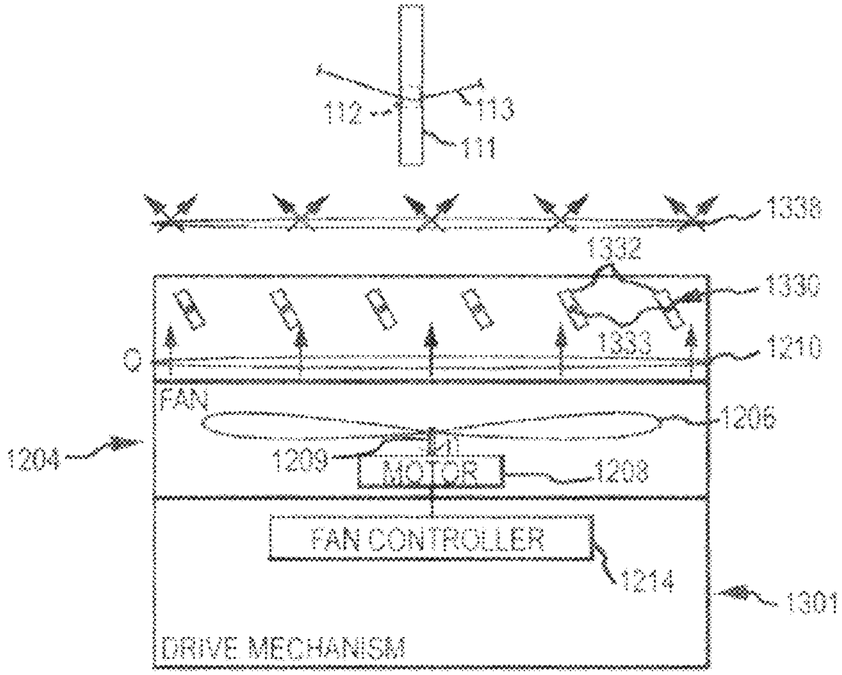
FIG. 13 is a schematic illustration of another fan-based chaos engine similar to that shown in FIG. 12 that further includes vanes or louvers redirecting outlet air flow from a fan to create a desired driving air flow.

FIG. 13 illustrates another fan-based drive mechanism 1301 that may be utilized in kinetic flame effect devices. The mechanism 1301 may be thought of as a modified version of drive 1201, and like components are numbered similarly and not described in detail again here. Specifically, the drive mechanism 1301 includes a fan 1204 that may use a fan controller 1214 (e.g., one with switch circuitry) to change fan speeds, n, over time to create a varying (chaotic) flow rates, Q, of the fan output airflow 1210. Further, though, the drive mechanism 1301 includes an airflow direction assembly 1330 with one, two, or more vanes/louvers (or wind directors) 1332 that may be mounted on elements 1333 so as to be fixed or moved/pivoted. The vanes 1332 may be a combination of movable and fixed on mounts 1333 in some cases to create a desired flow 1338. In some cases, the movement of vanes 1332 is in response to airflow 1210 while in other cases motors and controllers (not shown) are provided in drive 1301 to selectively position the vanes/directors 1332 to vary and control the airflow 1338.

The airflow direction assembly 1330 uses its vanes/directors 1332 to redirect the airflow 1210 to provide redirected driving airflow 1338 that contacts and moves the pendulum member 111 in a chaotic manner. The use of the directors 1332 may allow the fan controller 1214 to run the motor 1208 at fewer varying speeds, n, or even a constant speed, n, and still provide a chaotic driving airflow 1338. However, in some embodiments, the fan controller will still change the fan speeds, n, and/or turn the motor 1208 on and off over time to varying the volumetric flow rate, Q, of the fan output airflow 1210 to create more unpredictable movement of the member 111.

In other embodiments, the drive mechanism may manually move the pendulum member through repeated contacts or striking of the lower end of its body. For example, a paddle wheel type drive mechanism may be provided with paddles or strikers that contact a lower end of the pendulum member to cause it to pivot on its support member. To obtain a more chaotic movement, the paddles/strikers may purposely not be equally spaced apart about the circumference or periphery of the wheel (e.g., differing angular offsets between adjacent paddles/strikers). Further, the paddles/strikers may be of differing lengths so as to contact the pendulum member at different times and with differing forces/effects. Still further, chaotic and kinetic movement of the pendulum member may be achieved by having the paddles/strikers contact the pendulum member at differing locations along its width. This can be achieved by having paddles/strikers that are not as wide as the pendulum member (e.g., smaller diameter pins or rods) that strike the pendulum surface at center, off-center to the right (at one or more offset distances), and off-center to the left (at one or more offset distances), which will cause the pendulum member to not only move in the direction of rotation of the wheel but also to twist or pivot relative to the support member (e.g., clockwise or counterclockwise rotation of the pendulum member based on the offset). Still further, chaotic movement may be caused by varying the speed and/or direction of rotation of the wheel.

Figure 14B:
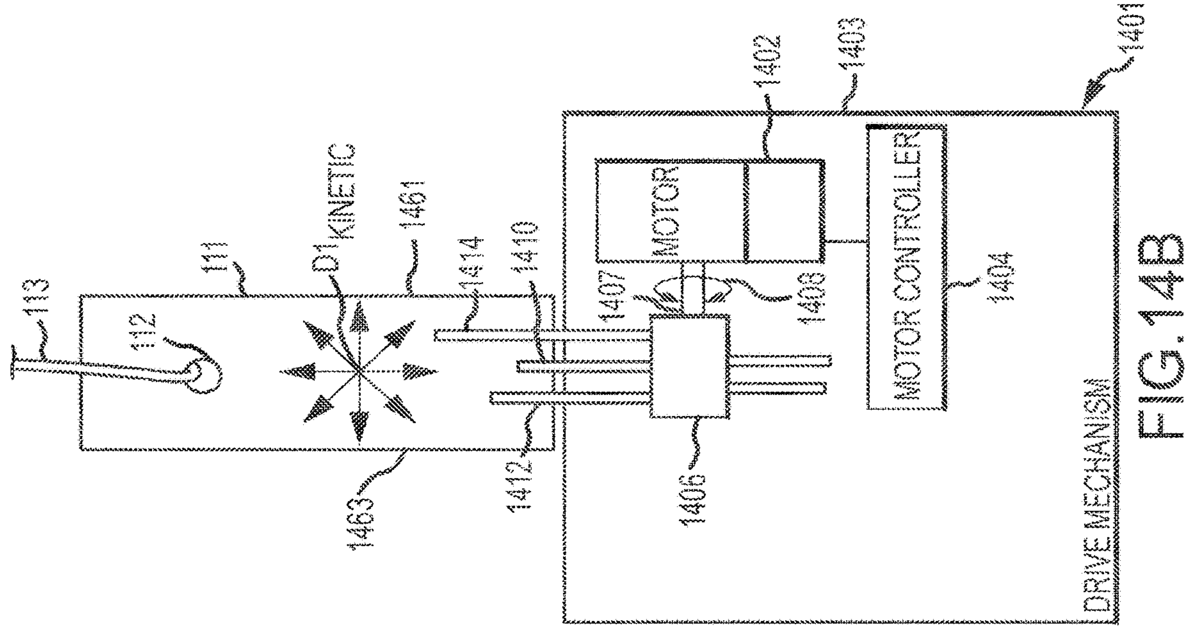
FIGS. 14A and 14B provide two schematic views of a chaos engine or drive mechanism that utilizes paddles or strikers on outer surfaces of a driven wheel to drive movement of a pendulum member.
Figure 14A:
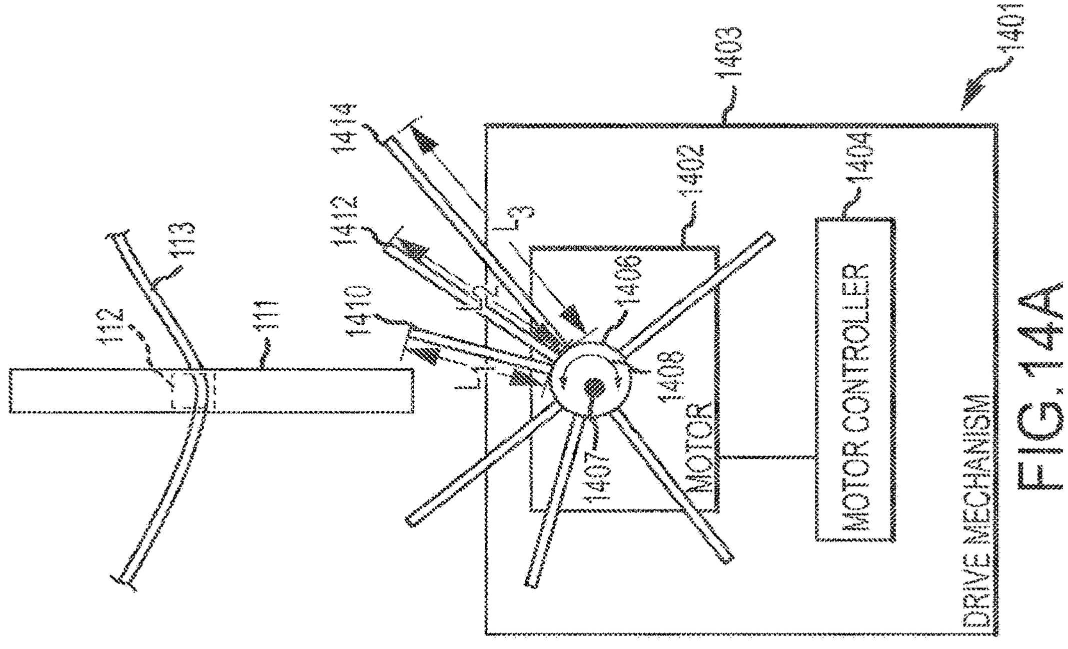

FIGS. 14A and 14B provide side and front views of a paddle wheel-type drive mechanism 1401. The drive mechanism 1401 includes a housing 1403, which may be supported in a kinetic flame effect device housing so as to position the drive mechanism 1401 proximate to an end of a pendulum member such as member 111 as shown. The drive mechanism 1401 includes a motor 1402 that is selectively operated by a motor controller 1404 (e.g., at particular rotation speeds and directions). The motor 1402 rotates a drive shaft 1407 to rotate a wheel 1406 in one or two directions as shown with arrow 1408.

Significantly, the wheel 1406 includes a plurality of paddles or strikers that contact the edge or end of the body of the pendulum member 111 causing it to have kinetic movement, $D1_{Kinetic}$. To achieve chaotic movement, the wheel 1406 may be rotated 1408 in differing directions and at differing speeds by motor 1402 and its controller 1404. Further, though, a number of the paddles/strikers may have differing lengths and/or be at differing angular offsets from each other. For example, it may be preferably to unequally space the paddles about the periphery or circumference to the wheel 1406 to change the timing of contacts or strikes on pendulum member 111 even at a constant rotation rate of the wheel 1406.

Also, the rods/strikers may have differing lengths. This is shown with paddles/strikers 1410, 1412, 1414, which are shown to have three lengths, L1, L2, and L3. The first length, $L_1$, of rod 1410 is long enough to allow the rod 1410 to strike the pendulum member 111 (at least at the lowest or most proximate position of the member 111 such as hanging straight down or up) but so as to be shorter than the second length, $L_s$, of rod 1412. Likewise, the third length, $L_3$, of rod 1414 is longer such that this paddle 1414 may strike the pendulum member 111 even when it has been moved or swung through a relatively large angle on support member 113. The three rods 1410, 1412, 1414 are shown as being equidistally separated on wheel 1406 but may be spaced apart at unequal angular offsets as shown with other paddles/strikers on wheel 1406 (e.g., paddle 1410 may be at an offset of 15 degrees from paddle 1412 which may at an offset of 30 degrees from paddle 1414 or the like). The variance in the lengths of the paddles 1410, 1412, 1414 and their relative positioning about the periphery of wheel 1406 may be varied widely to practice the invention and to achieve a desired movement of the pendulum member 111 with the important aspect being that variance in rotation speed, spacing of the paddles, length of the paddles, and other factors being useful for achieving an irregular or chaotic movement of the pendulum member 111 (e.g., one similar to that achieved with time-varying magnetic field, $M_1$).

To increase the chaotic characteristics of kinetic movement, $D1_{Kinetic}$, the paddles/strikers may be arranged on the wheel 1406 so as to strike the pendulum member 111 at differing locations (i.e., not all at the center of the body of member 111). FIG. 14B shows that the paddles/strikers 1410, 1412, 1414 may take the form of rods or pins each having a diameter that is smaller than the width of the body of the pendulum member 111. Further, the paddles 1410, 1412, 1414 are spaced apart at differing locations along the support or mounting surface of the wheel 1406. As shown, the paddle 1410 is centrally located so as to strike the body of the pendulum member 111 near or at the center point between edges/sides 1461, 1463. In contrast, paddle 1412 is offset a distance from the paddle 1410 towards an edge of the mounting surface of the wheel 1406 so as to strike the body of pendulum member 111 near edge 1463 while paddle 1414 is offset a distance from the paddle 1410 in the other direction toward another edge of the mounting surface of the wheel 1406 so as to strike the body of pendulum member 111 near edge 1461. In this manner, the pendulum member 111 is moved in more than just two directions (along support 113) but is also caused to rotate about its support point.

The drive mechanism 1401 provides a drive process in which a motor moves a wheel and the moving wheel (or rods attached to it) hit the bottom of the pendulum member (or flame element in some cases) at various times. The contact times are determined based on the differing lengths of the paddles or rods that are placed at various points along the circumference of the wheel's circumference, and these varying contacts and irregularly timed intervals cause chaotic movement of the pendulum member. The wheel movement can be reversed to change directions (counterclockwise to clockwise and vice versa) and the wheel can be rotated at differing speeds by motor controller. Further, the wheel may rotate fully or may simply move back and forth (e.g., rotate 1408 the rod/shaft 1407 from a first angular position to a second angular position such as through 90 to 180 degrees or more). The paddles/strikers (such as paddles 1410, 1412, 1414) may be thin pin-like rods with small diameters that hit the pendulum member (e.g., faux paper flame bottom) on the left, middle, or right side to move it angularly on the support member and also causing the body to rotate as well (e.g., to cause a light receiving surface of a flame silhouette to move in three dimensions to appear to flicker as a real flame would). In some cases, the wheel drive mechanism 1401 is modified to include the fan-based drive mechanism 1301 to achieve desired movement of the pendulum member 111.

Figure 15B:
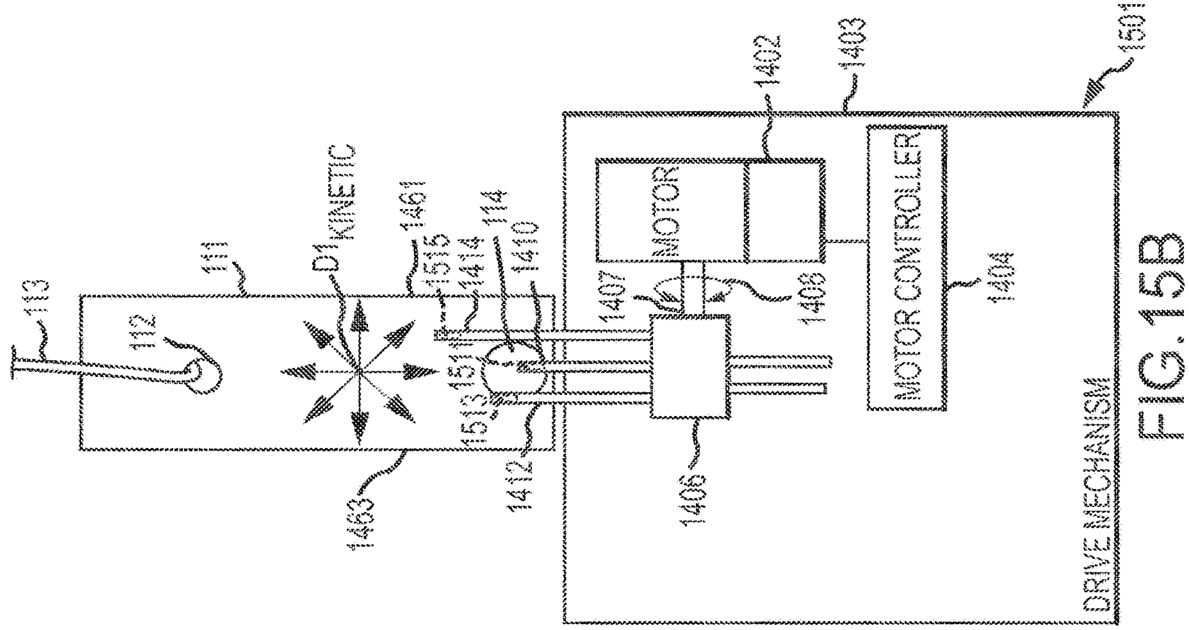
FIGS. 15A and 15B provide two schematic views of the chaos engine or drive mechanism of FIGS. 14A and 14B, which utilizes paddles or strikers on outer surfaces of a driven wheel to drive movement of a pendulum member, as modified to include magnetic coupling members on the ends of the paddles/strikers to magnetically interact with a magnetic coupling member on an end of the pendulum member.
Figure 15A:
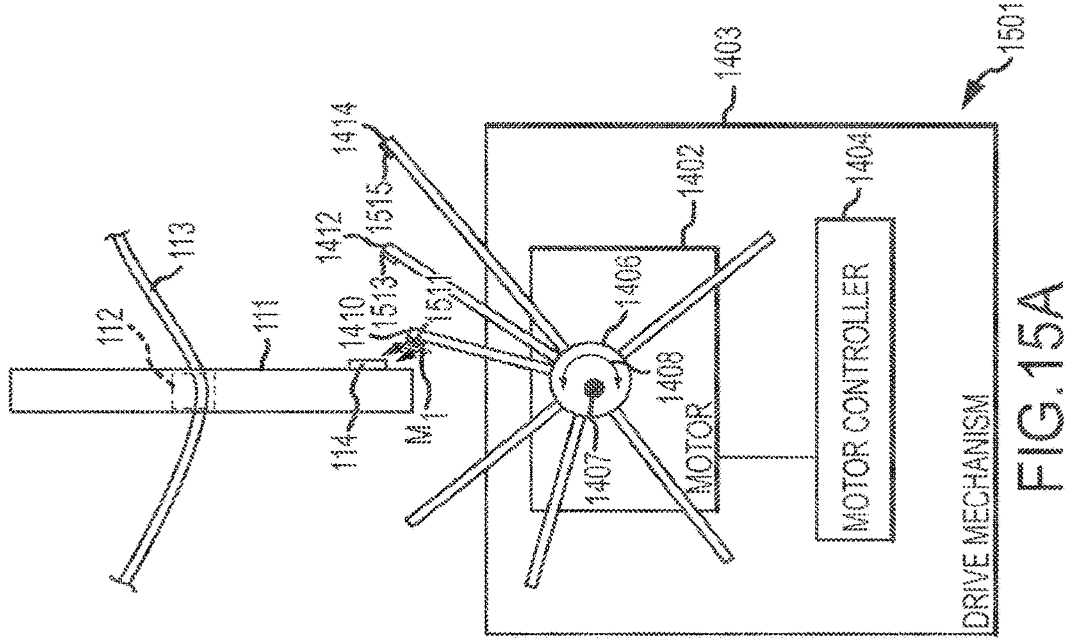

With the use of the drive mechanism 1401, the pendulum member 111 is not required to include the magnetic coupling member or element 114. However, there may be applications where it is desired to avoid or reduce physical contact between the paddles or strikers (such as strikers 1410, 1412, 1414) and the pendulum member 111 and to rely again on interaction with a magnetic field. To this end, FIGS. 15A and 15B provide two schematic views of a chaos engine or drive mechanism 1501 that may be thought of as a modified version of mechanism 1401 to include magnetic coupling members on the ends of the paddles/strikers to magnetically interact with a magnetic coupling member on an end of the pendulum member.

Specifically, the pendulum member 111 is shown to include the magnetic coupling member or element 114, which may be a permanent magnet or ferrous tag or the like as discussed above. Each of (or a subset of) the paddles on wheel 1406 include magnetic coupling members (such as a permanent magnet when the coupling member 114 is a ferrous tag or magnet or a ferrous tag when the member 114 is a permanent magnet). For example, paddle 1410 is shown to include a magnetic coupling member 1511 near its end (or portion that contacts or nearly contacts pendulum member 111 and its coupling member 114), paddle 1412 is shown to include a magnetic coupling member 1513 near its end, and paddle 1414 is shown to include a magnetic coupling member 1515 near its end.

Then, as the paddles 1410, 1412, 1414 rotate with wheel 1406 to be positioned near the pendulum member 111, a driving magnetic field/magnetic interaction, $M_1$, is created that causes the pendulum member 111 to have chaotic motion, $D1_{Kinetic}$. In this embodiment, the coupling or interaction is typically repulsive so as to move the pendulum 111 away from approaching paddles/strikers 1410, 1412, 1414 but without actual physical contact (as was case for drive mechanism 1401). When the coupling members 1511, 1513, 1515 are permanent magnets these magnets may have the same or differing strengths to further cause chaotic movement, and, in some cases, the pole direction may vary among the coupling members/vanes to move the pendulum member with alternating or varying magnetic fields, M1 (attractive, repulsive, repulsive, attractive, or any other desired pattern of varying field direction).

As with the mechanism 1401, the paddles may be spaced apart at differing angular offsets, the paddles may have one, two, or more lengths, the paddles may be spaced apart from the center of the wheel so as to rotate the pendulum member 111, and the motor may rotate the wheel in one or two directions at one, two, or more speeds that may be varied over time. The moving wheel may have magnets of various powers on the vanes/paddles thus moving the pendulum member (with its magnetic coupling member) in chaotic directions. The wheel movement may be reversed in direction and be moved/rotated at differing speeds. The wheel motion may be circular (full rotations) or simply be slow back and forth (clockwise and counterclockwise) movements. The rods/paddles may have small pin-like diameters and be arranged on the wheel mounting surface so as to apply the magnetic field in-line or off-line/offset a distance to the left or right so as to turn the surface of the pendulum member.

Figure 16:
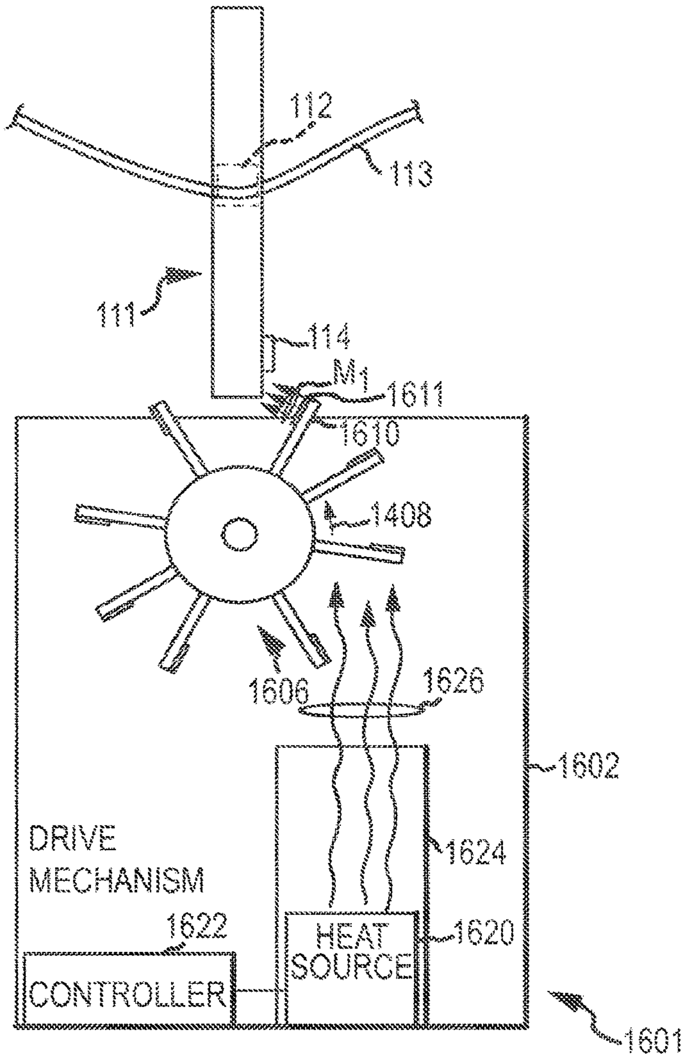
FIG. 16 provides a schematic illustration of a heat-based chaos engine or drive mechanism that may be used alone or in combination with another for the drives to move a pendulum member of a kinetic flame effect device in a chaotic manner.

In some embodiments, a kinetic flame effect device such as device 100 of FIG. 1 may be modified to replace the drive mechanism 101 with one that utilizes heat to move the pendulum member. FIG. 16 illustrates a heat-based drive mechanism 1601 that includes a housing 1602 that may be positioned within a housing of a kinetic flame effect device such as device 100 such that an end that exposes paddles or vanes of a rotating wheel 1606 are exposed to and proximate to a pendulum member 111. As shown, the drive mechanism 1601 includes a wheel 1606 that is pivotally mounted (e.g., mounted on a shaft or axle for free rotation 1608 about its center axis) in the housing 1602. From the wheel 1606, a number of paddles or vanes 1610 extend outward a distance and each paddle/vane 1610 includes a magnetic coupling member 1611 such as a permanent magnet or a ferrous tag (when the coupling member 114 is a magnet). The coupling members 1611 interact magnetically with a magnetic coupling member 114 on the pendulum member 111 as shown with arrows $M_1$.

The drive mechanism 1601 further includes a heat source 1620 that is run or driven by a controller 1622 (e.g., operated periodically to vary its temperature or amount of heat it generates to vary the movement 1608 of wheel 1606 to enhance the chaotic movement of pendulum member 111). The heat source 1620 generates heat that causes hotter air 1626 to rise out of a stack or air guide 1624 so as to be directed upward toward the wheel 1606. At this point, the moving hot air 1626 strikes the paddles/vanes 1610 and causes the wheel 1606 to rotate 1608. The paddles/vanes 1608 in this embodiment may be shaped and sized to provide greater surface area than in mechanisms 1401, 1501 to facilitate being driven by moving air 1626. Again, when permanent magnets are used for members 1611, they may be of differing strengths, sizes, and direction to vary the interaction, $M_1$. The heat source 1620 may be an LED, a resistor, or other heat generator.

As can be seen, many variations to the above-described embodiments are possible, and these variations may include mixing and matching the features shown and/or described. For example, the drive mechanisms may include more than one of the drive coils (or other drive devices) such as two or more side-by-side or angularly arranged coils to create the driving magnetic field, $M_1$.

The wheels shown in the drive mechanisms may be replaced with an elliptical camshaft that is driven/rotated by a motor and motor controller to periodically contact a pendulum member (directly or with strikers) or to place two, three, or more magnetic coupling member in proximity to the magnetic coupling member of the pendulum member. A dampening spring or other motion dampener may be attached to one or both of the pendulum members to modulate or control their chaotic movement within a desired motion envelope and/or to limit its speed of movement on its support.

The housing/body may be cylindrical as shown or another shape such as tapered such that the upper pendulum member is in a smaller diameter portion of the housing (e.g., the upper/second stage is smaller than or tapers inward from the lower/first stage). The power sources used may also be varied widely and may include solar power sources and/or rechargeable power sources (e.g., provide a kinetic flame device in the form of a rechargeable and/or solar powered tea light, votive candle, and the like).

The invention claimed is:

1. An electronic candle device, comprising:

a casing including an interior space and a hole located at a top surface of the casing;

two flexible support members mounted, at each of their respective ends, to interior sidewalls of the casing such that the two flexible support members span across the interior space;

a pendulum mounted within the interior space, wherein:

the pendulum includes a bottom section, a middle section, and a top section, the top section of the pendulum comprises a flame sheet that resembles a shape of a candle flame that extends through the hole of the top surface of the casing, the bottom section of the pendulum includes a magnet, one of the two flexible support members passes through the middle section of the pendulum, another of the two flexible support members passes through the top section of the pendulum, and the two flexible support members are configured to allow the pendulum to swing in response to a magnetic force exerted onto the pendulum via interactions of a magnetic field with the magnet;

at least one light emitting diode (LED) positioned to illuminate a portion of the top section of the pendulum;

an electromagnetic coil positioned below the bottom section of the pendulum to generate the magnetic field that interacts with the magnet of the bottom section of the pendulum;

a circuit coupled to the electromagnetic coil, wherein the circuit is configured to provide a time-varying signal to the electromagnetic coil to produce a flickering effect; and batteries coupled to the circuit, wherein the batteries are positioned at a lower section within the casing.

2. The electronic candle device of claim 1, wherein the flame sheet comprises a distorted sheet material that extends in three dimensions.

3. The electronic candle device of claim 1, wherein the at least one LED is configured to provide color variation.

4. The electronic candle device of claim 1, wherein the circuit is configured to vary an intensity of illumination from the LED.

5. The electronic candle device of claim 1, further comprising:

a lens coupled to the at least one LED to optically direct light into a desired size or shape onto the flame sheet.

6. The electronic candle device of claim 1, wherein the circuit is configured to produce a sinusoidal, a square wave signal, or a pulse modulated signal.

7. The electronic candle device of claim 1, wherein the circuit is positioned proximate to the batteries at the lower section within the casing.

8. The electronic candle device of claim 1, further comprising a wick extending upward.

9. The electronic candle device of claim 8, wherein the wick is part of a cap that is removable coupled to the hole.

10. The electronic candle device of claim 1, wherein the casing comprises a translucent material.

11. The electronic candle device of claim 1, wherein the LED is positioned at an inclined angle with respect to the flame sheet to project light onto the flame sheet from within the casing and through the hole at the top surface of the casing.

12. The electronic candle device of claim 1, wherein each of the two flexible support members has a length greater than a diameter of the interior space to allow the two flexible support members slack to be displaced from an original position.

13. A lighting apparatus, comprising:

a casing including an interior space and a hole located at a top surface of the casing;

a pendulum member within the interior space, wherein:

the pendulum member includes a bottom section, a middle section, and a top section, the top section of the pendulum member comprises a flame element that resembles a shape of a candle flame that extends through the hole of the top surface of the casing, the middle section of the pendulum member is configured for suspension of the pendulum member to allow the pendulum member to swing, the bottom section of the pendulum member, and one or more light sources positioned to illuminate a portion of the top section of the pendulum member; and a magnetic mechanism positioned below the bottom section of the pendulum member to interact with the bottom section of the pendulum member such that the pendulum member swings in response to a magnetic force produced by the magnetic mechanism, wherein the magnetic mechanism is configured to provide a time-varying signal to produce a flickering effect.

14. The lighting apparatus of claim 13, wherein the one or more light sources comprise one or more light emitting diode (LEDs).

15. The lighting apparatus of claim 13, wherein the magnetic mechanism is coupled to a signal generator configured to produce a sinusoidal signal, a square wave signal, or a pulse modulated signal to control the time-varying signal provided by the magnetic mechanism.

16. The lighting apparatus of claim 13, wherein the magnetic mechanism comprises one or more electromagnetic coils.

17. The lighting apparatus of claim 16, wherein the magnetic mechanism is coupled to a controller configured to control an operation of the magnetic mechanism.

18. The lighting apparatus of claim 13, wherein at least one of the one or more light sources is positioned at an inclined angle with respect to the flame element to project light onto the flame element from within the casing and through the hole at the top surface of the casing.

19. The lighting apparatus of claim 13, wherein the one or more light sources are configured to produce light of different colors.

20. The lighting apparatus of claim 13, further comprising:

two flexible support members mounted, at each of their respective ends, to interior sidewalls of the casing such that the two flexible support members span across the interior space, wherein one of the two flexible support members passes through the middle section of the pendulum member and another of the two flexible support members passes through the top section of the pendulum member.

* * * * *